United States Patent
Duan

(10) Patent No.: US 10,878,984 B2
(45) Date of Patent: Dec. 29, 2020

(54) ACTUATOR, LIGHT SCANNING APPARATUS AND OBJECT DETECTING APPARATUS

(71) Applicant: Dolphin Co., Ltd., Koshigaya (JP)

(72) Inventor: Zhihui Duan, Kawaguchi (JP)

(73) Assignee: DOLPHIN CO., LTD., Koshigaya (JP)

( * ) Notice: Subject to any disclaimer, the term of this patent is extended or adjusted under 35 U.S.C. 154(b) by 0 days.

(21) Appl. No.: 16/725,523

(22) Filed: Dec. 23, 2019

(65) Prior Publication Data

US 2020/0381156 A1    Dec. 3, 2020

Related U.S. Application Data

(63) Continuation of application No. 16/725,302, filed on Dec. 23, 2019.

(30) Foreign Application Priority Data

May 28, 2019 (JP) ................................ 2019-099001

(51) Int. Cl.
*H01F 7/14* (2006.01)
*G01B 11/14* (2006.01)
(Continued)

(52) U.S. Cl.
CPC .......... *H01F 7/1615* (2013.01); *G01B 11/14* (2013.01); *G01B 11/2518* (2013.01); *G01S 17/93* (2013.01)

(58) Field of Classification Search
CPC ... H01F 7/1615; G01S 17/93; G01B 11/2518; G01B 11/14
(Continued)

(56) References Cited

U.S. PATENT DOCUMENTS

| 4,387,297 A | 6/1983 | Swartz |
| 8,767,190 B2 | 7/2014 | Hall |

(Continued)

FOREIGN PATENT DOCUMENTS

| CN | 207663045 U | 7/2018 |
| JP | H0255560 A | 2/1990 |

(Continued)

OTHER PUBLICATIONS

"Magnetic Materials: Soft Magnets," University of Birmingham, United Kingdom, downloaded Apr. 27, 2020 from https://www.birmingham.ac.uk/Documents/college-eps/metallurgy/research/Magnetic-Materials-Background/Magnetic-Materials-Background-10-Soft-Magnets.pdf, 5 pages. (Year: 2020).*

(Continued)

*Primary Examiner* — Daniel L Murphy
(74) *Attorney, Agent, or Firm* — Rossi, Kimms & McDowell LLP

(57) ABSTRACT

An actuator includes a column shaped magnet having an S-pole and an N-pole thereof positioned opposite to each other across a central axis of the magnet. A driving coil is disposed near the magnet, the driving coil comprising a first portion and a second portion positioned opposite to each other across the magnet, the first portion and the second portion are generally parallel to the central axis, current flowing in opposite directions in the first portion and the second portion when powered on. A ferromagnetic material is disposed outside the driving coil along the central axis, distance from the central axis to the ferromagnetic material varying with the direction from the central axis. A driving circuitry is configured to apply a drive signal, the drive signal having a periodically varying voltage or current. The magnet performs reciprocating rotation in accordance with the drive signal applied by the driving circuitry.

19 Claims, 22 Drawing Sheets

(51) Int. Cl.
*G01B 11/25* (2006.01)
*G01S 17/93* (2020.01)
*H01F 7/16* (2006.01)

(58) Field of Classification Search
USPC ........................................................ 356/4.01
See application file for complete search history.

(56) References Cited

U.S. PATENT DOCUMENTS

| | | | | |
|---|---|---|---|---|
| 8,965,691 | B1* | 2/2015 | Lombrozo | .............. G01P 3/481 |
| | | | | 701/26 |
| 9,063,549 | B1* | 6/2015 | Pennecot | ................ G01S 17/93 |
| 10,571,552 | B1* | 2/2020 | Gao | ...................... G01S 17/931 |
| 2006/0066282 | A1 | 3/2006 | Soeda | |
| 2007/0291343 | A1 | 12/2007 | Kato | |
| 2009/0123158 | A1 | 5/2009 | Ray | |
| 2016/0233753 | A1 | 8/2016 | Benner, Jr. | |

FOREIGN PATENT DOCUMENTS

| | | |
|---|---|---|
| JP | H02259618 A | 10/1990 |
| JP | H02288988 A | 11/1990 |
| JP | H05284714 A | 10/1993 |
| JP | H07199111 A | 8/1995 |
| JP | 2004170965 A | 6/2004 |
| JP | 2006087208 A | 3/2006 |
| JP | 2008170579 A | 7/2008 |
| JP | 2009048081 A | 3/2009 |
| JP | 2012226359 A | 11/2012 |
| JP | 2013165539 A | 8/2013 |

OTHER PUBLICATIONS

NICLASS. "A 100-m Range 10-Frame/s 340×96-Pixel Time-of-Flight Depth Sensor in 018-μm CMOS." IEEE Journal of Solid-State Circuits. Feb. 2013: 559-572. vol. 48, No. 2. Cited in Specification.

Shimizu, Naoshige "Redundant system and LiDAR to realize level 3, Audi becomes pioneer of autonomous driving." Nikkei Automotive, Nikkei Business Publications, Sep. 2017, pp. 22-23. Cited in Specification.

Notice of Reasons for Refusal issued in Japanese Appln. No. 2019-103457 dated Sep. 24, 2019. English machine translation provided.

Notice of Reasons for Refusal issued in Japanese Appln. No. 2019-099001 dated Sep. 24, 2019. English machine translation provided.

Office Action issued in U.S. Appl. No. 16/725,302 dated Apr. 2, 2020.

Notice of Allowance issued in U.S. Appl. No. 16/725,302 dated Jul. 24, 2020.

\* cited by examiner

{Fig. 1}
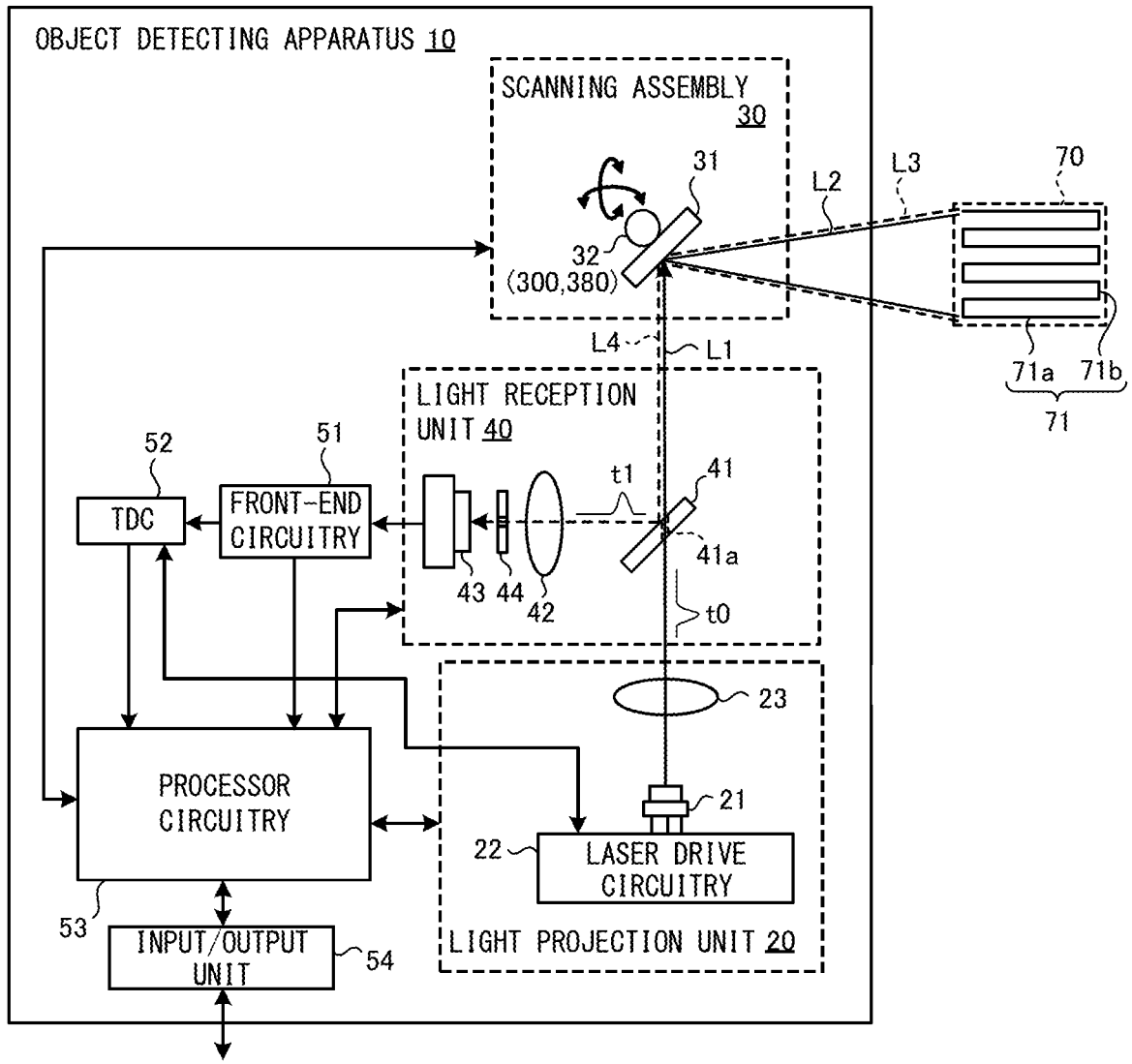
{Fig. 2}
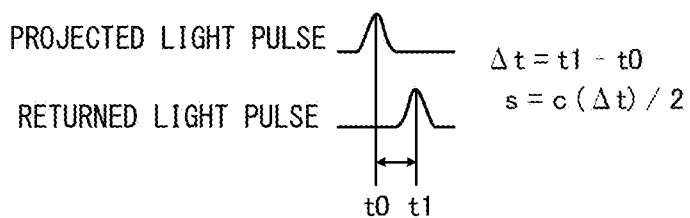

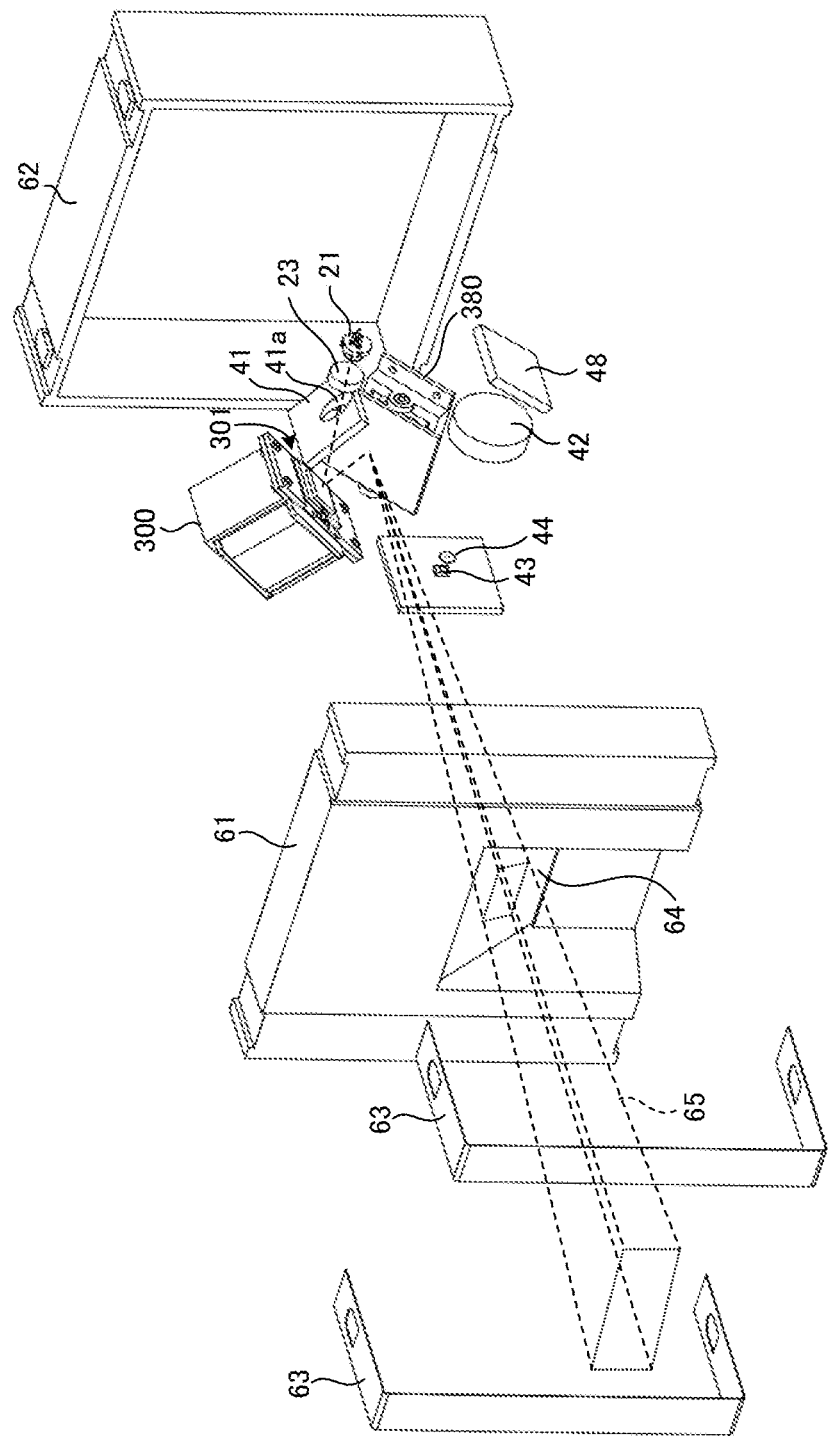
{Fig. 3}

{Fig. 4}
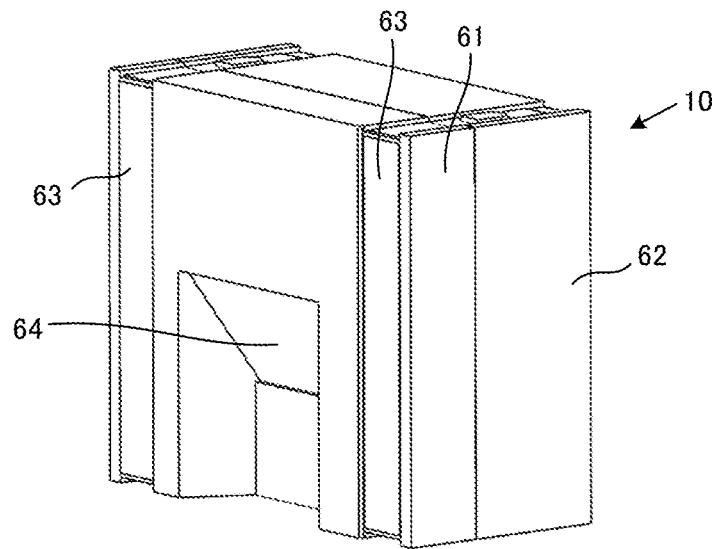
{Fig. 5}
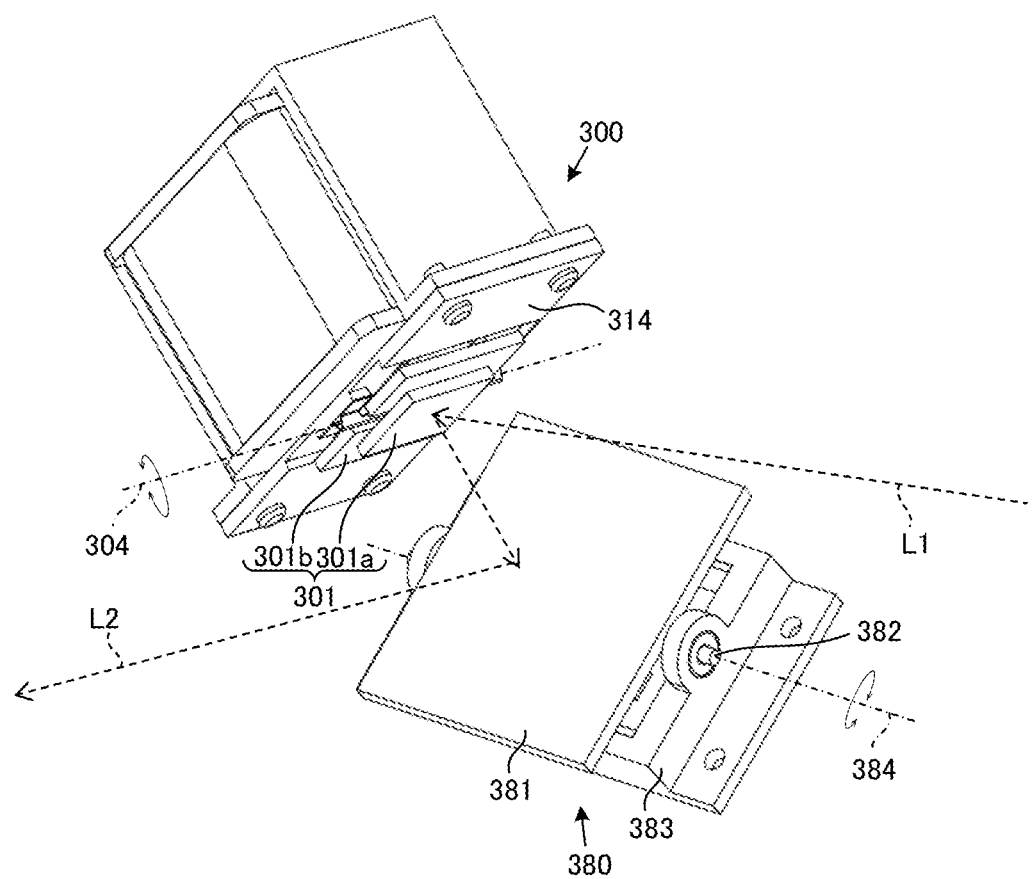

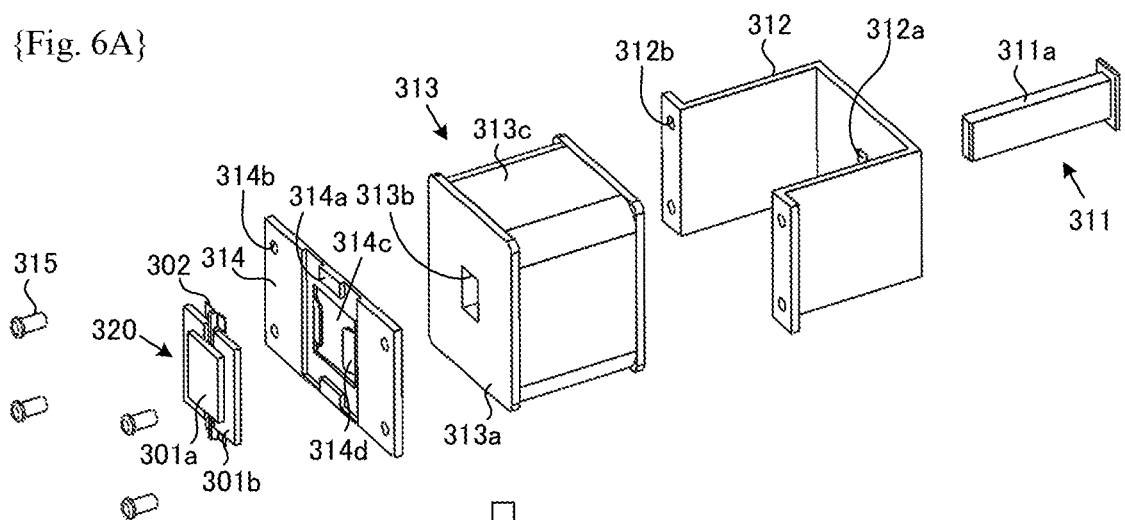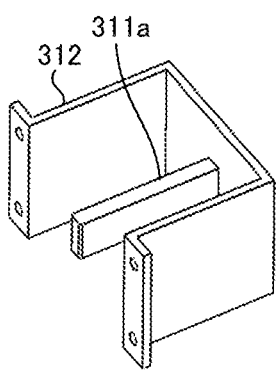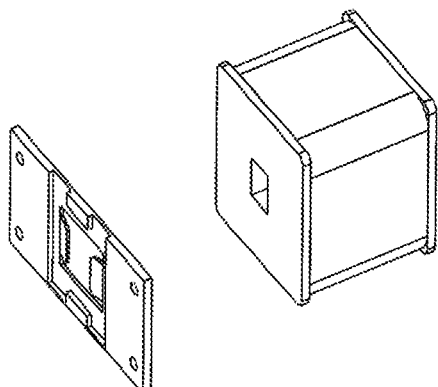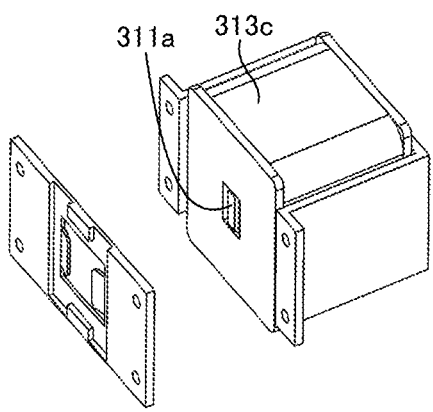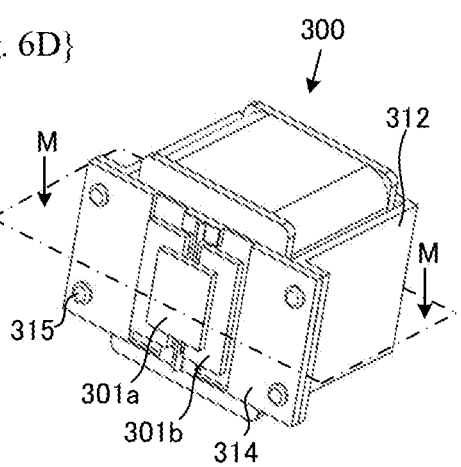

{Fig. 7}
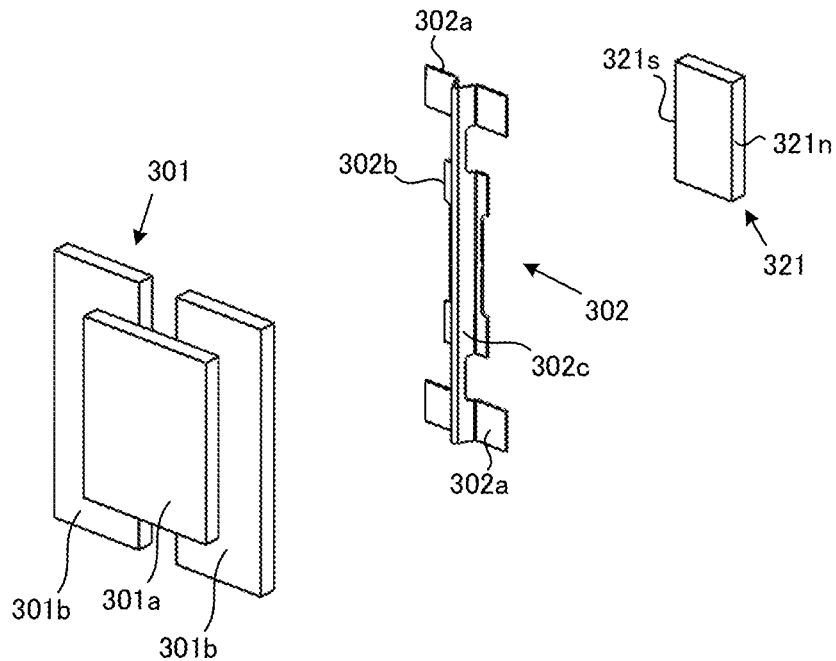
{Fig. 8}
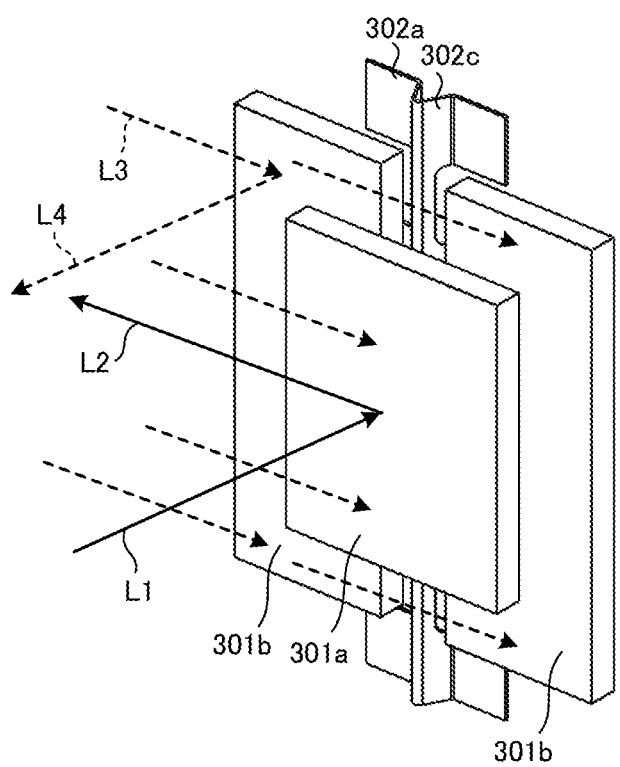

{Fig. 9}
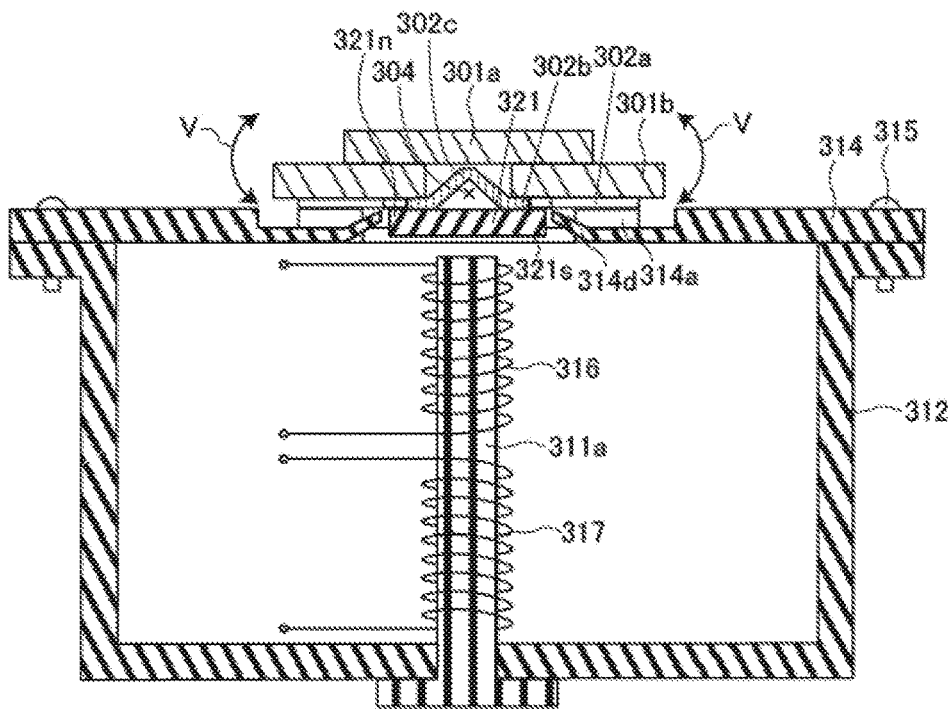
{Fig. 10}
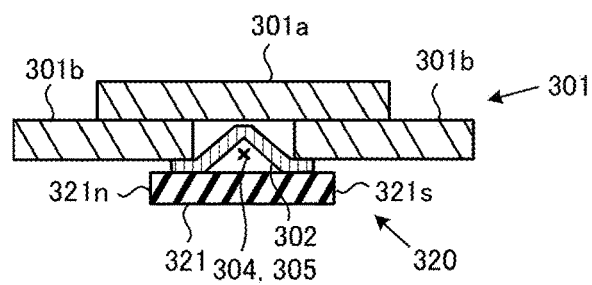
{Fig. 11}
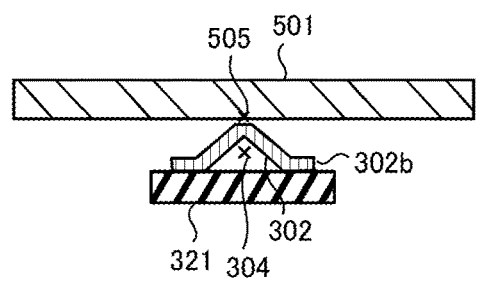
{Fig. 12}
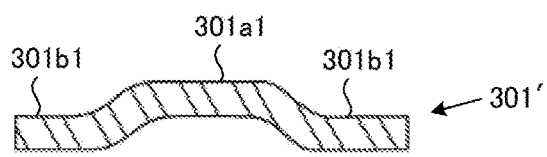

{Fig. 13}
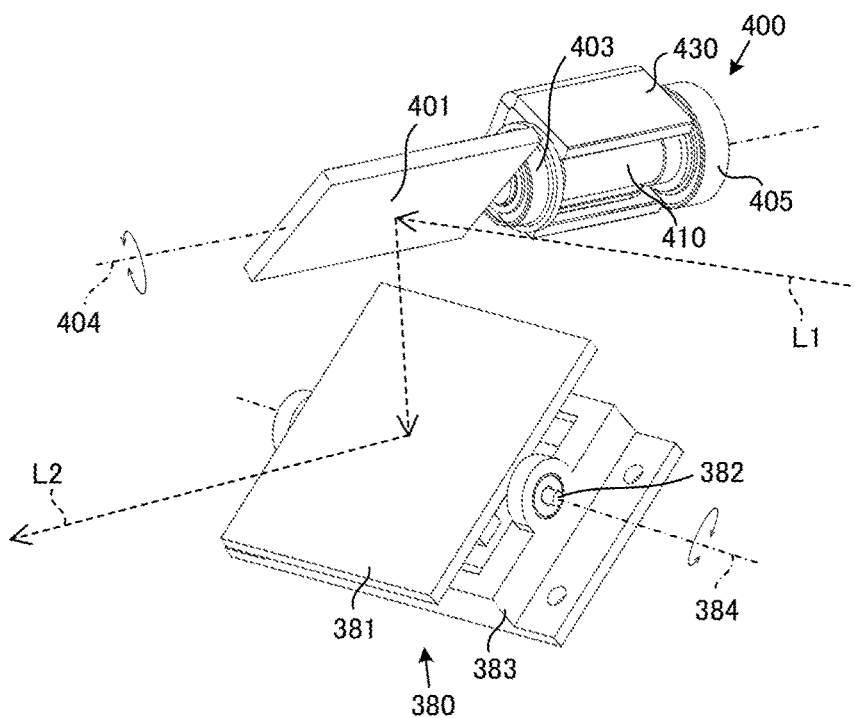
{Fig. 14}
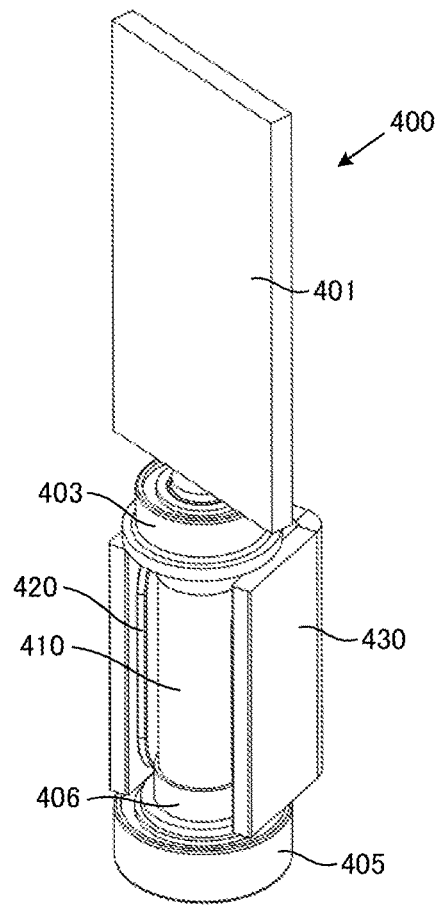

{Fig. 15}
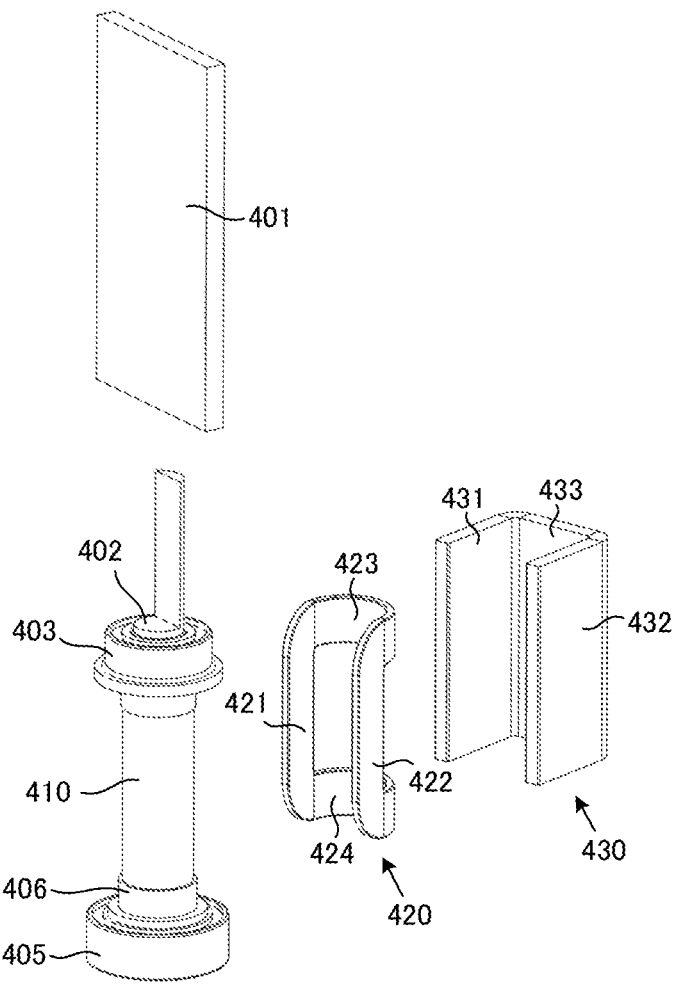

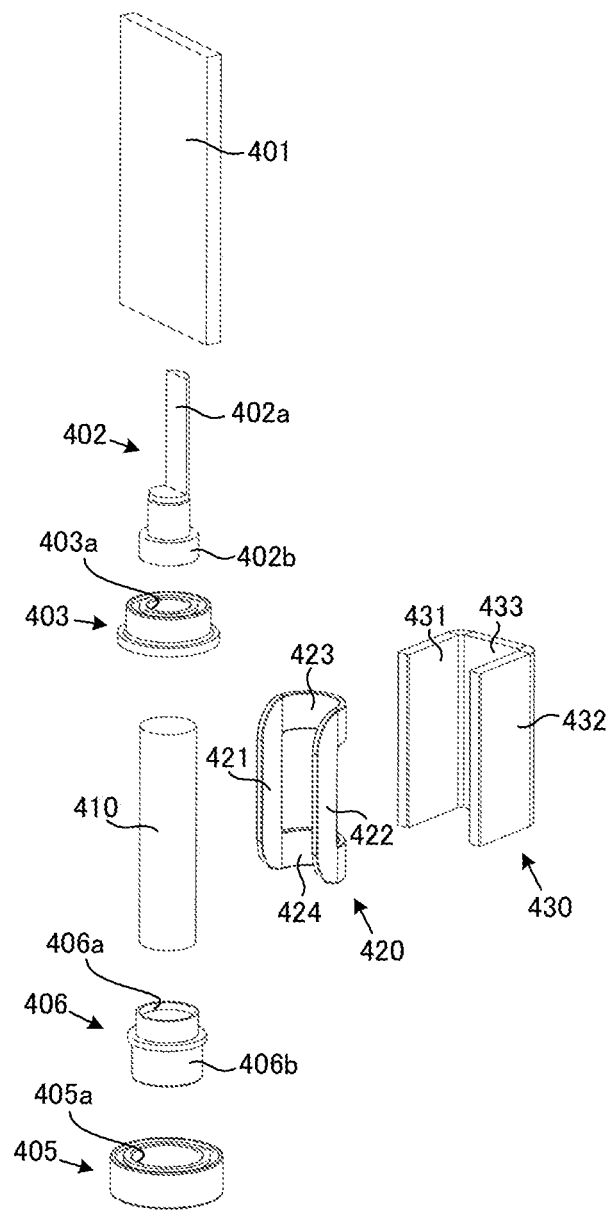
{Fig. 16}

{Fig. 17A}
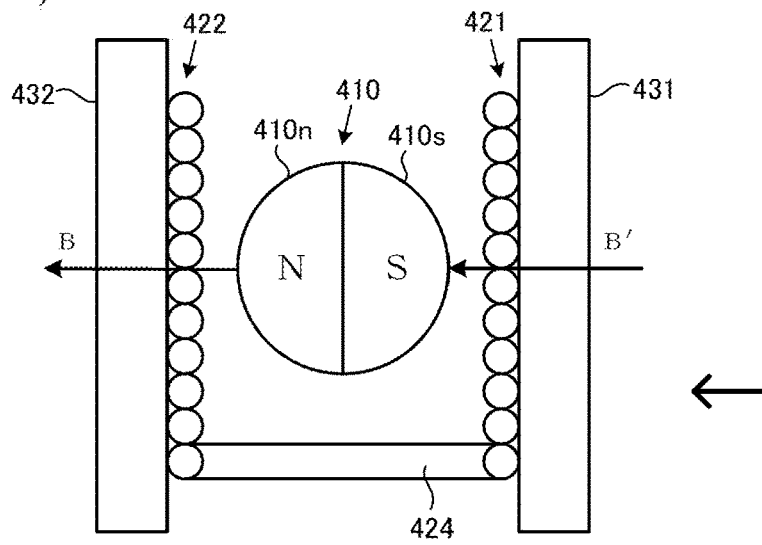
{Fig. 17B}
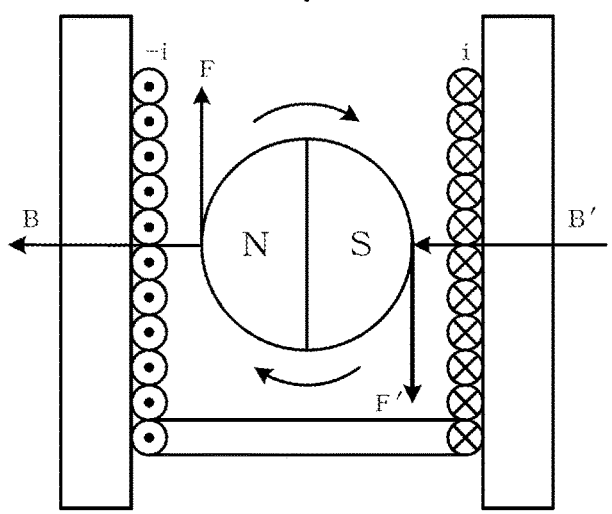
{Fig. 17C}
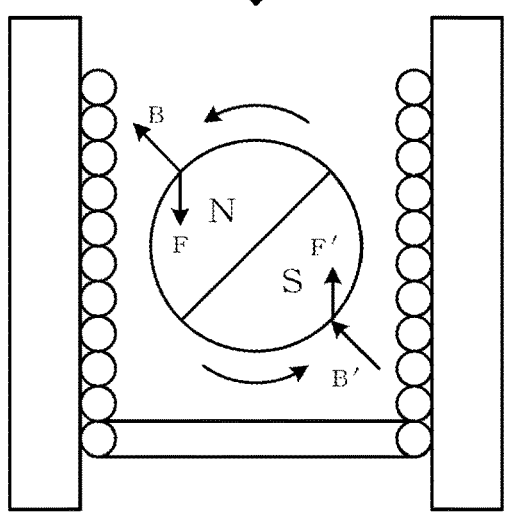

{Fig. 18A}
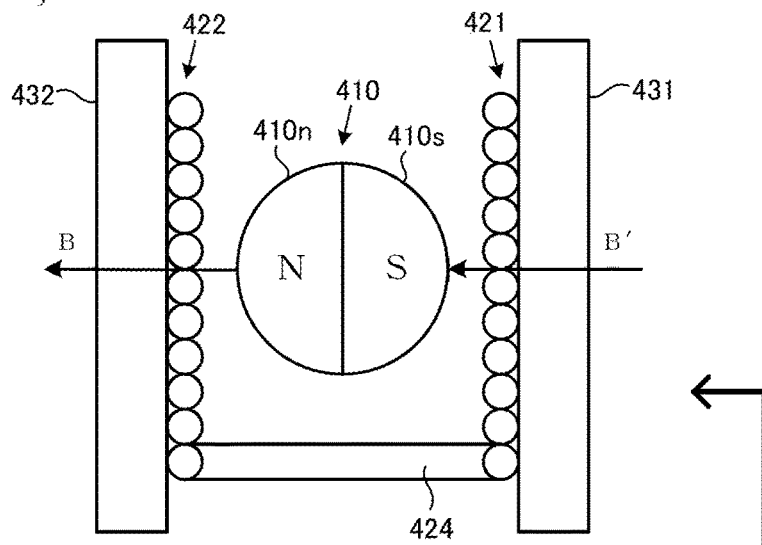
{Fig. 18B}
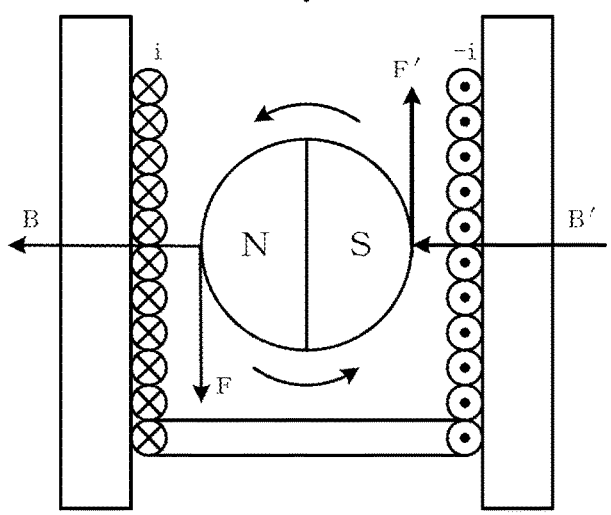
{Fig. 18C}
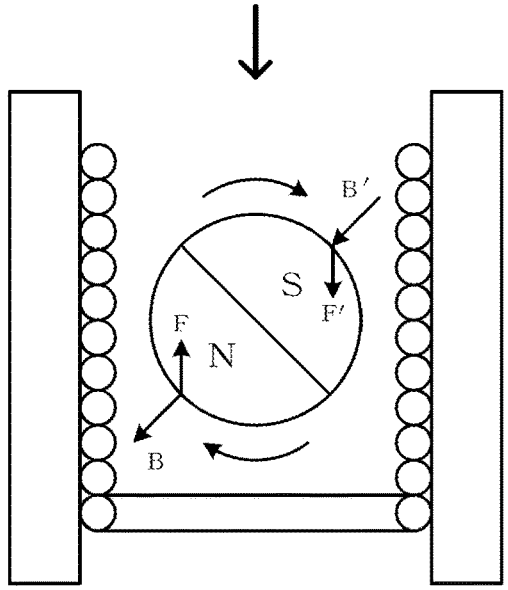

{Fig. 19}
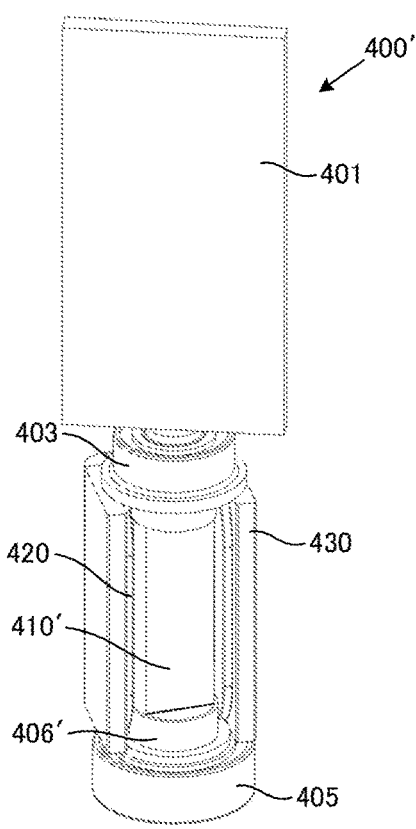
{Fig. 20}
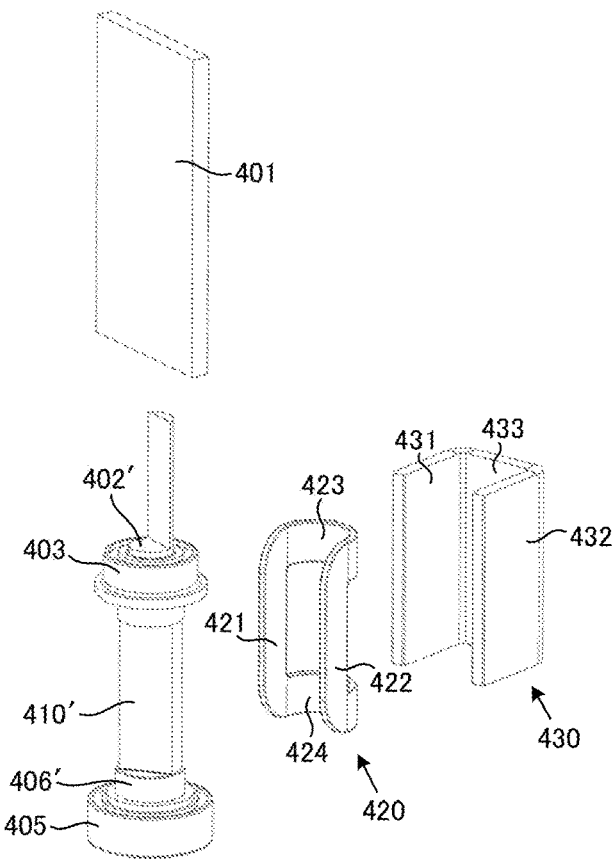

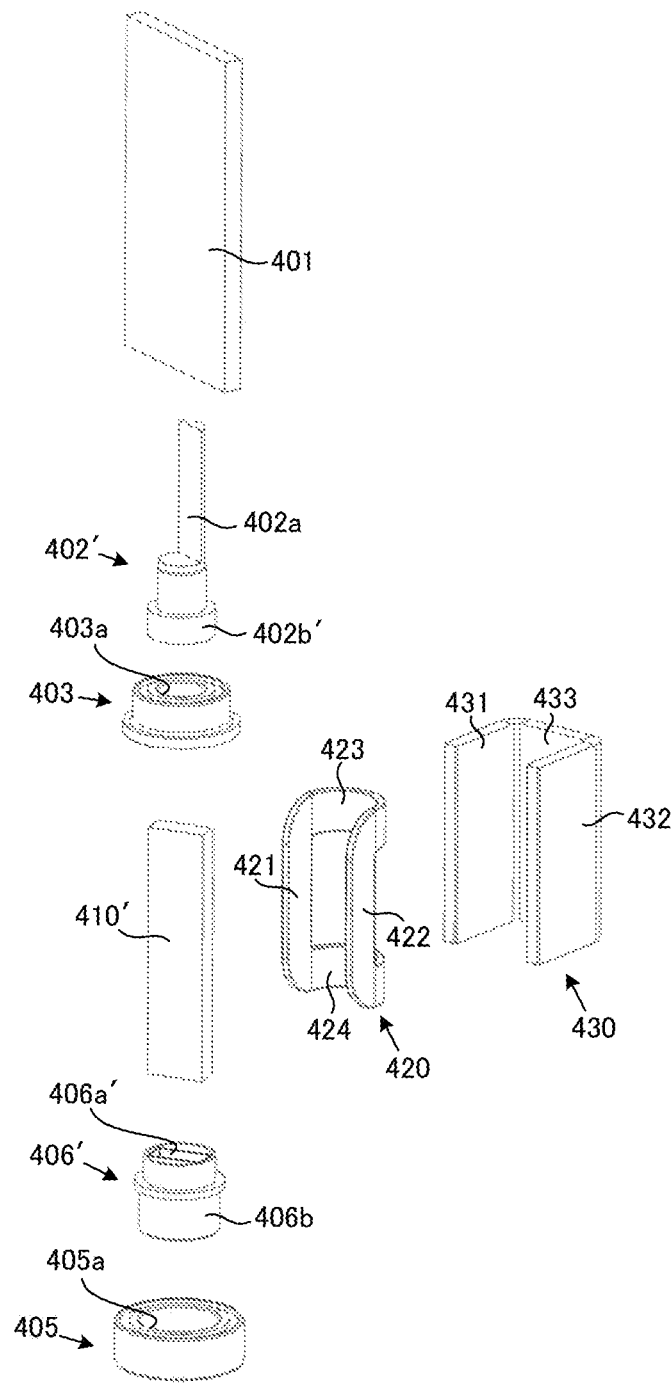
{Fig. 21}

{Fig. 22A}
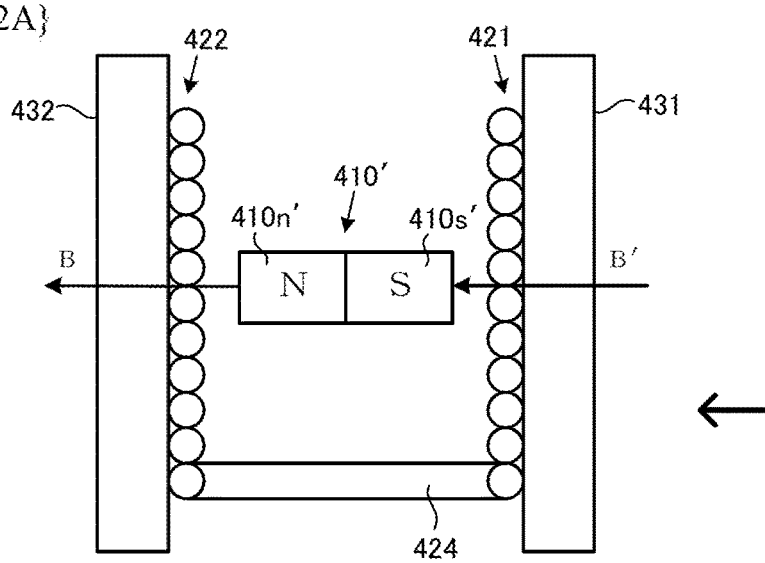
{Fig. 22B}
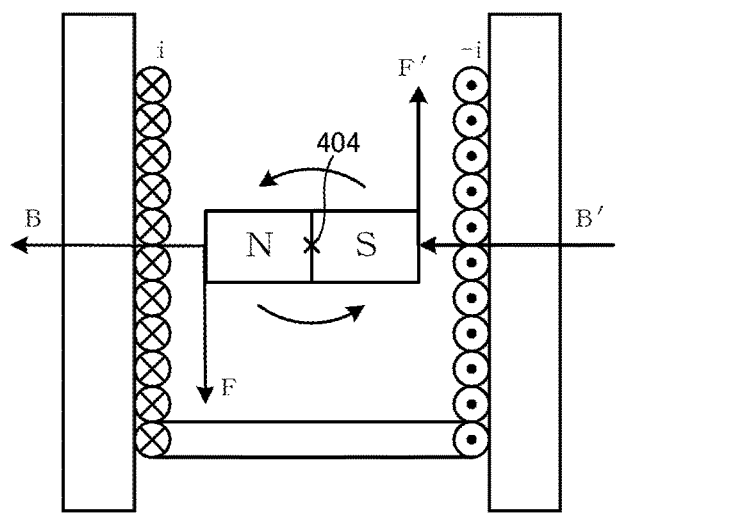
{Fig. 22C}
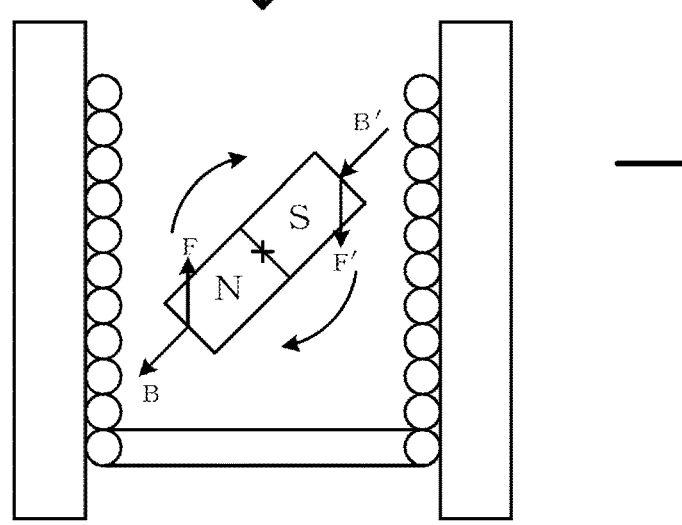

{Fig. 23A}
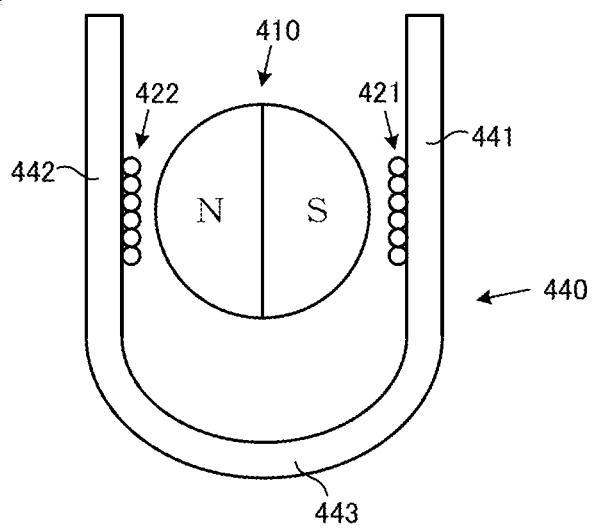
{Fig. 23B}
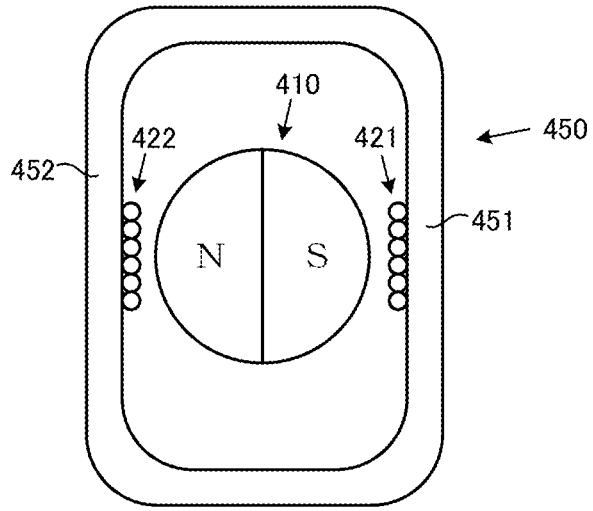
{Fig. 23C}
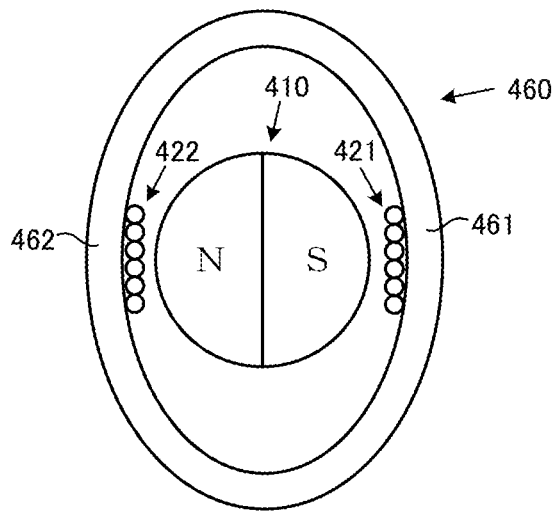

{Fig. 24A}
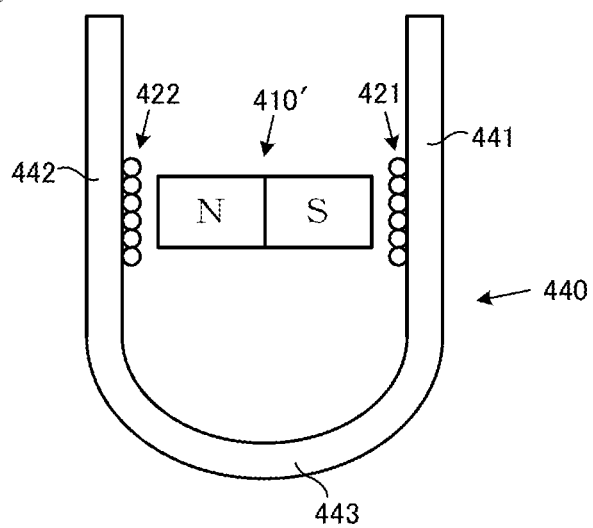
{Fig. 24B}
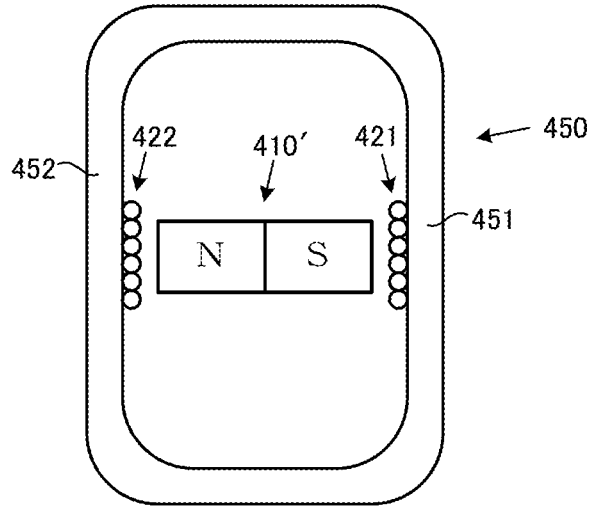
{Fig. 24C}
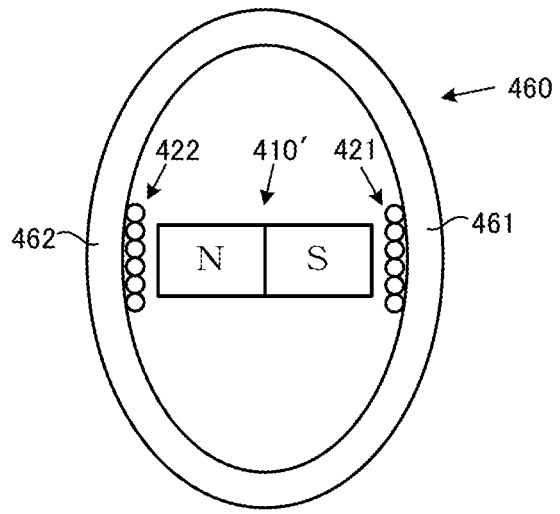

{Fig. 25}
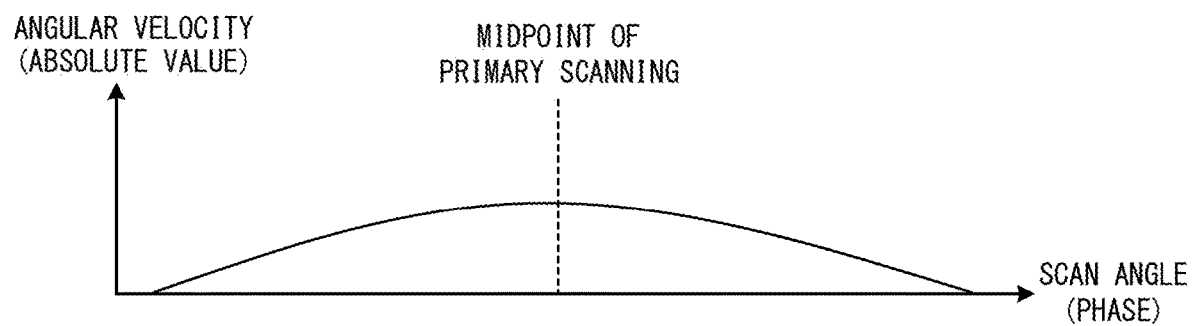
{Fig. 26}
{Fig. 27}
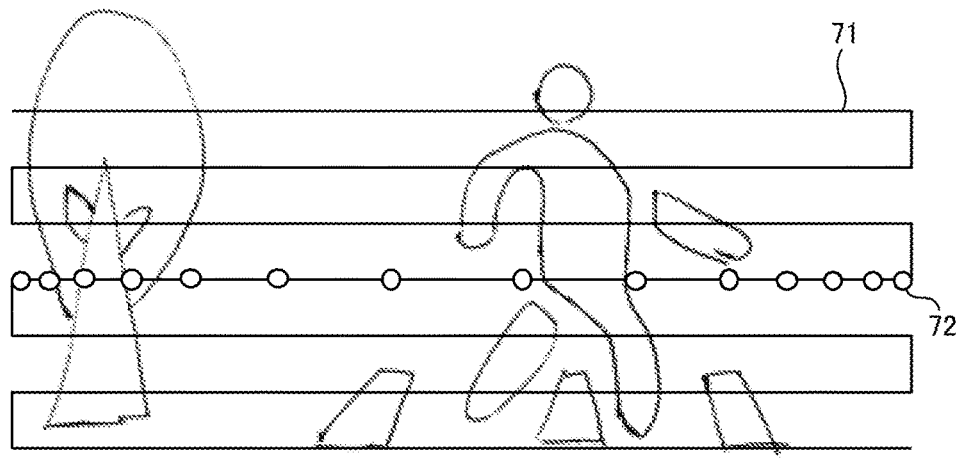

{Fig. 28}
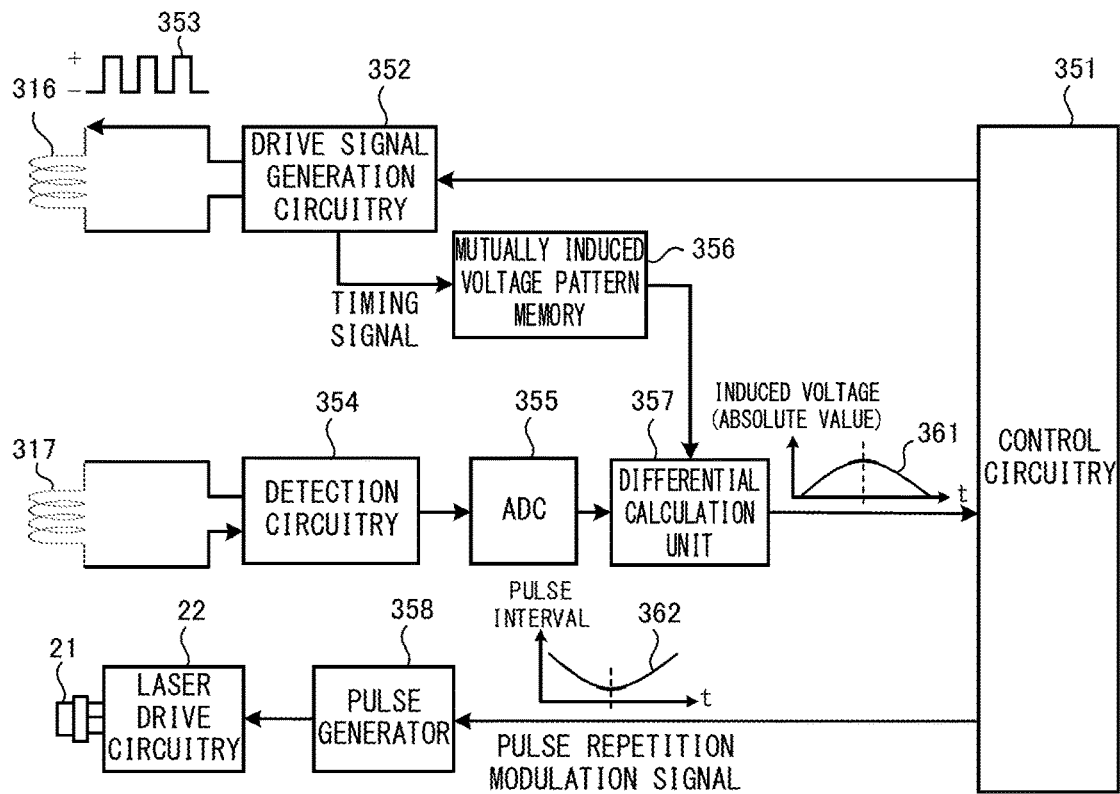
{Fig. 29}
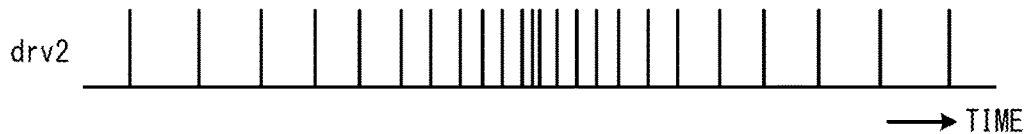
{Fig. 30}
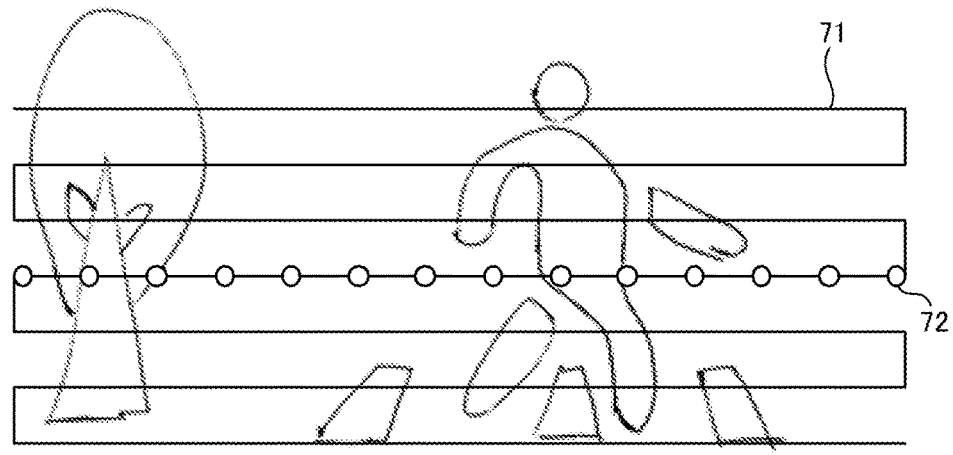

{Fig. 31}
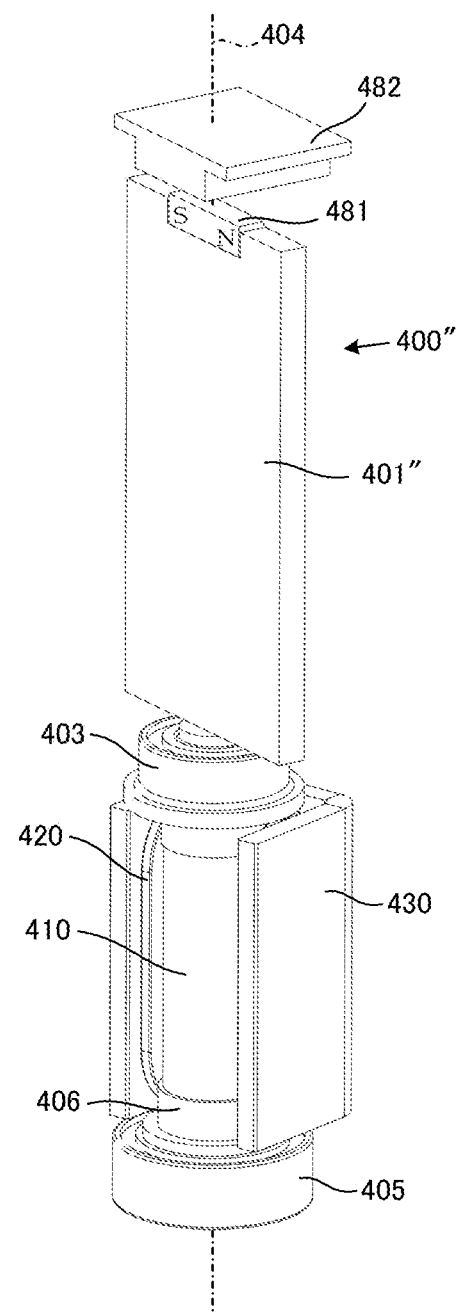

{Fig. 32}
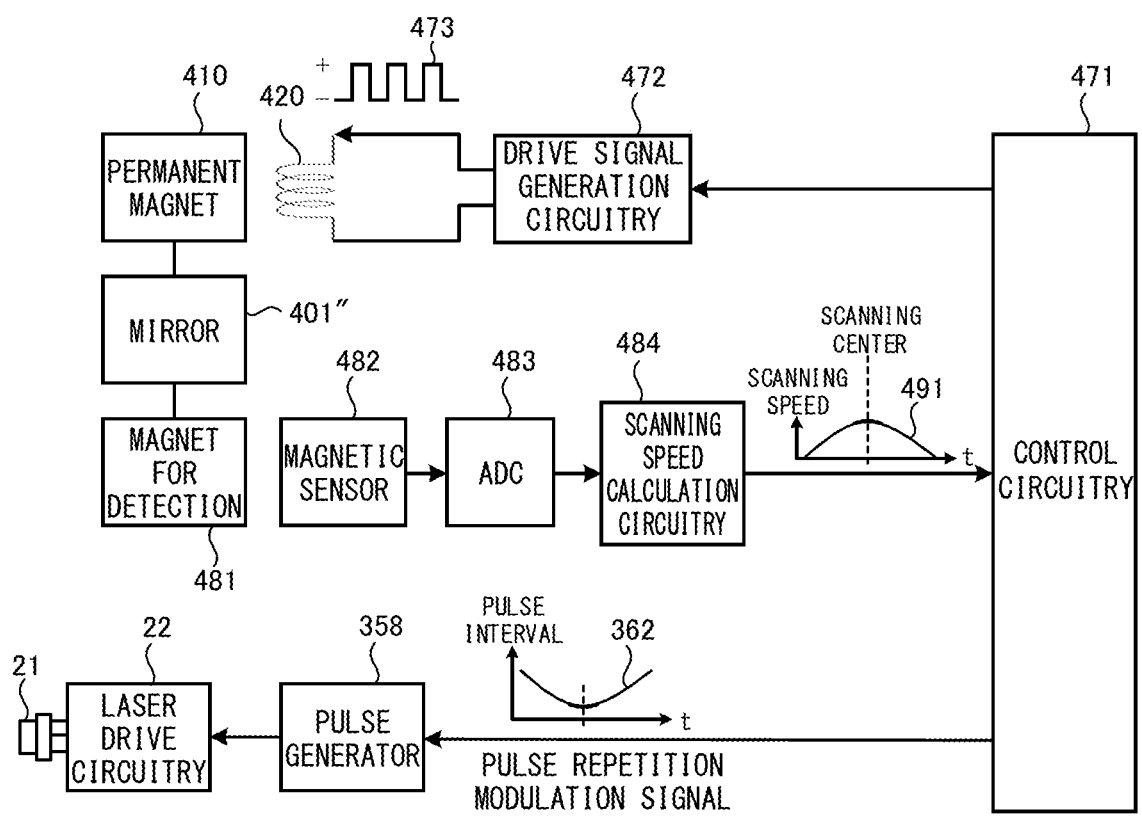

{Fig. 33A}
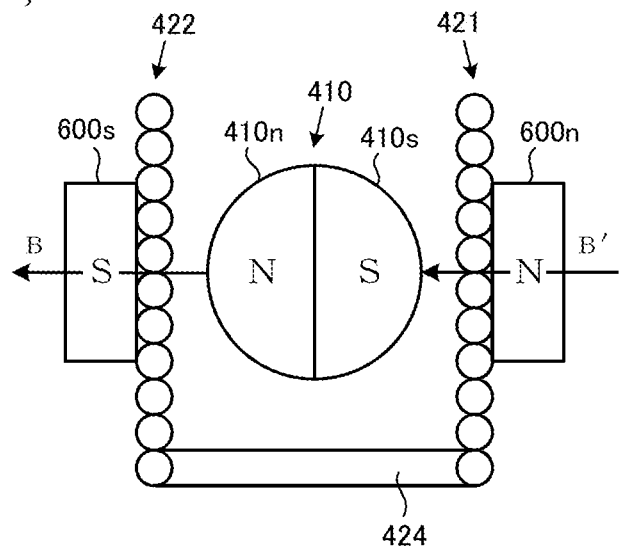
{Fig. 33B}
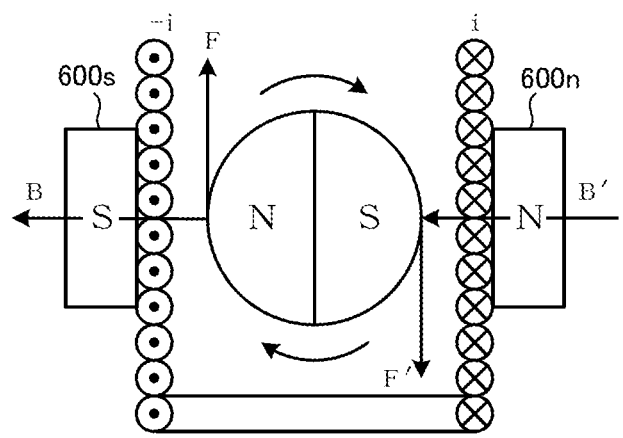
{Fig. 33C}
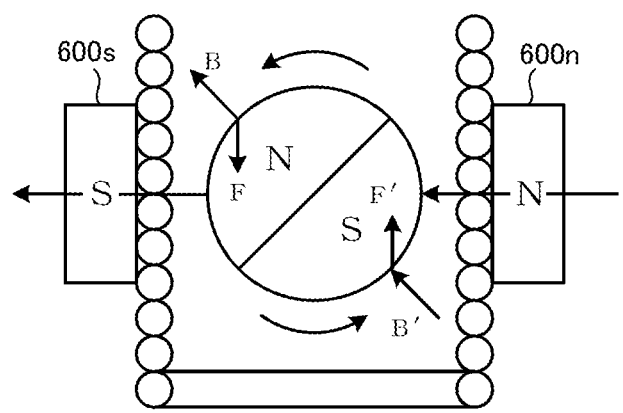

{Fig. 34}
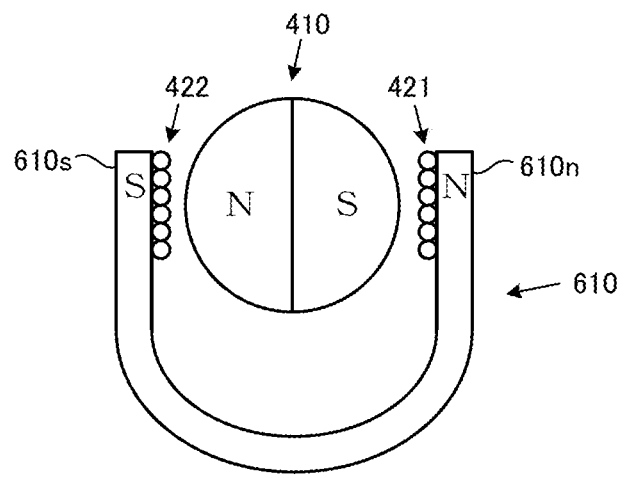
{Fig. 35}
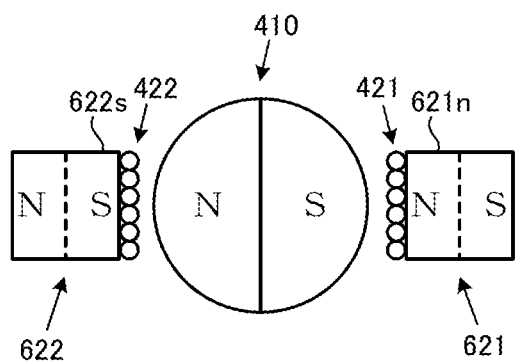

ACTUATOR, LIGHT SCANNING APPARATUS AND OBJECT DETECTING APPARATUS

TECHNICAL FIELD

The present invention relates to an actuator for reciprocating a target object, a light scanning apparatus adopting the actuator, and an object detecting apparatus for detecting an object along an optical path of a laser beam by adopting the actuator and the laser beam.

BACKGROUND

Object detecting apparatus has been conventionally used to detect laser beam reflected by an object by irradiating laser pulse outward, thereby detecting the distance to the object along the optical path of the laser beam and the object itself. Such an object detecting apparatus is called LiDAR (Light Detection and Ranging).

In recent years, LiDAR has come to be applied in the field of autonomous driving of vehicles. In order to compensate for the shortcomings of a camera sensor which is susceptible to an external lighting environment and a milliwave radar which is of low resolution, and further to realize high-precision detection of a small obstacle in a driving environment, LiDAR is used in association with, for example, the camera sensor or the milliwave radar.

For example, the patent literature 1 (PTL1) discloses an example of a LiDAR that can be used in the field of autonomous driving. In the LiDAR recited in PTL1, a near-infrared laser as a light source and a light detecting element as a receiver are configured on a substrate as a pair, where 32 or 64 pairs of light sources and receivers are setup based on the elevation measurement angle in order to acquire high-resolution distance information within the overall field of view. Therefore, the apparatus is large and expensive.

In addition, another example of LiDAR is recited in non-patent literature 1 (NPL1). In the LiDAR recited in NPL1, a polygon mirror having three faces with different inclination angles is rotated to deflect a laser beam, thereby the laser beam is projected within a field of view of 4.5° in a vertical direction, and the reflected light from the object is reflected on the surface same as the projection surface of the polygon mirror and guided to a light detecting element for detection.

In the LiDAR recited in NPL1, the reflected light from a plurality of vertical positions can be detected by a light-receiving element. However, in the LiDAR recited in NPL1, since the polygon mirror having reflecting surfaces with different inclination angles is used, it is difficult to design the centroid of mass of the polygon mirror, and results in high manufacturing cost.

A LiDAR using a rotating mirror is also recited in NPL2, but the structure of the LiDAR is not described in detail in NPL2.

CITATION LIST

Patent Literature

{PTL1} U.S. Pat. No. 8,767,190.

Non Patent Literature

{NPL1} Cristiano Niclass, et al., "A 100-m Range 10-Frame/s 340×96-Pixel Time-of-Flight Depth Sensor in 0.18-μm CMOS", IEEE JOURNAL OF SOLID-STATE CIRCUITS, Institute of Electrical and Electronics Engineers, FEBRUARY 2013, VOL. 48, NO. 2, p. 559-572

{NPL2} Shimizu, Naoshige "Redundant system and LiDAR to realize level 3, Audi becomes pioneer of autonomous driving" Nikkei Automotive, Nikkei Business Publications, September, 2017, pp. 22-23

SUMMARY

In order to improve the detection accuracy and detection sensitivity of an object by the LiDAR, it is desirable to scan within the predetermined field of view with a laser beam at a high speed and with a high density. On the other hand, in case of general universal-purpose LiDAR, it is important to reduce the power consumption. Particularly, the restriction to power consumption is strict in cases where large capacity batteries cannot be used, especially in such cases that the LiDAR would be mounted on a compact mobility object or on a wearable apparatus such as a glass or a helmet. Further, in either case, high durability is of course preferable.

The technologies recited in PTL1, NPL1 and NPL2 cannot sufficiently meet such requirements for the scanning.

With consideration of the circumstances above, the purpose of the present invention is to enable a structure to implement a scanning, in which the projection direction of a light beam periodically changes, with low power consumption and high durability. In addition, the present invention is preferably applied to an object detecting apparatus like a LiDAR, but is not limited to object detection. The present invention is also applicable to light scanning of other purposes, and does not limit the use of the actuator according to the present invention for other purposes besides light scanning.

For the above purposes, an actuator according to the present invention includes: a torsion spring fixed to a support member; a permanent magnet coupled to the torsion spring where the permanent magnet is placed with an N-pole and an S-pole thereof across a rotational axis of the torsion spring; a driving coil faced to the permanent magnet and located on a side of the permanent magnet opposite to the torsion spring; a drive circuitry configured to apply a drive signal with periodically varying voltage or current; and a mirror unit fixed to the torsion spring and located on an opposite side of the permanent magnet, the mirror unit comprising a first reflecting surface near a center of the torsion spring and a second reflecting surface around the first reflecting surface and parallel to the first reflecting surface, a second plane including the second reflecting surface being closer to the rotation axis of the torsion spring than a first plane including the first reflecting surface, and the mirror unit reciprocating in accordance with application of the drive signal.

In such an actuator, a centroid of mass of the mirror unit is substantially on the rotation axis of the torsion spring.

Preferably, the mirror unit includes: a first mirror having the first reflecting surface; and a second mirror having the second reflecting surface.

Preferably, a centroid of mass of the second mirror is closer to the rotation axis of the torsion spring than a centroid of mass of the first mirror.

Preferably, the centroid of mass of a movable member including the torsion spring, the mirror unit and the permanent magnet is substantially on the rotation axis of the torsion spring.

Further, a light scanning apparatus according to the present invention includes any of the above actuators, where a beam is projected after being reflected by the first reflecting surface of the mirror unit.

In addition, an object detecting apparatus according to the present invention includes: any of the above actuators; a laser light source configured to output a laser beam; a light-receiving element; an optical assembly configured to reflect the laser beam at the first reflecting surface of the mirror unit and project the reflected laser beam to outside, guide incident light incident from the outside on an optical axis same as an optical axis of the projected laser beam, and guide the incident light to the light-receiving element; and an object detecting assembly configured to detect a distance to an object located along an optical path of the projected laser beam and a direction in which the object is located, based on a projection timing and a projection direction of the laser beam and a timing of a light detection signal output by the light-receiving element.

Preferably, the object detecting apparatus includes: a speed detecting circuitry configured to detect a rotation speed of the mirror unit; and a pulse controller configured to control the pulse interval of the laser source based on the rotation speed detected by the speed detecting circuitry.

Moreover, another actuator according to the present invention includes: a column shaped movable magnet having an S-pole and an N-pole thereof positioned opposite to each other across a central axis of the movable magnet; a support member configured to support the movable magnet, so that the movable magnet is rotatable around the central axis; a driving coil disposed in vicinity of the movable magnet, the driving coil comprising a first portion and a second portion positioned opposite to each other across the movable magnet, the first portion including a first wire bundle generally parallel to the central axis, the second portion including a second wire bundle generally parallel to the central axis, current flowing in opposite directions in the first portion and the second portion when powered on; a ferromagnetic material fixed outside the driving coil along the central axis, distance from the central axis to the ferromagnetic material on a plane perpendicular to the central axis varying with direction from the central axis; and a drive circuitry configured to apply a drive signal, the drive signal having a periodically varying voltage or current.

In such an actuator, the movable magnet preferably performs reciprocating rotation in accordance with the drive signal applied by the drive circuitry.

Preferably, the ferromagnetic material is a soft magnetic material as a yoke.

Alternatively, the ferromagnetic material is preferably one piece of magnet, where an N-pole and an S-pole of the magnet face each other across the central axis of the movable magnet.

Alternatively, the ferromagnetic material preferably comprises a first magnet and a second magnet, where an N-pole of the first magnet and an S-pole of the second magnet face each other across the central axis of the movable magnet.

Preferably, the movable magnet is prismatic or cylindrical.

Preferably, the movable magnet moves toward a neutral position as a specific orientation when no voltage is applied to the driving coil, and the first portion and the second portion of the driving coil are respectively located opposite to the poles of the movable magnet at the neutral position.

Preferably, the distances from the central axis to the soft magnetic material are equal on both sides of the N-pole and the S-pole of the movable magnet at the neutral position, and the N-pole and the S-pole of the movable magnet at the neutral position face a direction with shortest distance from the central axis to the soft magnetic material.

Preferably, the driving coil is formed such that wire of the driving coil is connected to a first end of the second portion by winding from first end of the first portion around the central axis of the movable magnet along surface of the movable magnet, and connected to a second end of the first portion by winding from a second end of the second portion around the central axis of the movable magnet along the surface of the movable magnet.

Preferably, the movable magnet performs reciprocating rotation in accordance with the drive signal applied by the drive circuitry, within a range centered on a position of the movable magnet in a state where the drive signal is not applied.

Preferably, the actuator includes: a mirror fixed to an end portion of the movable magnet in its longitudinal direction, the mirror performing reciprocating rotation in accordance with the drive signal applied by the drive circuitry. The reciprocating rotation is preferably within a range centered on a position of the mirror in a state where the drive signal is not applied.

Preferably, a third magnet is disposed at an end of the mirror on an opposite side to the movable magnet side.

In addition, another light scanning apparatus according to the present invention includes any of the above described actuators and the light scanning apparatus reflecting a beam at the mirror and projecting the reflected beam.

Another object detecting apparatus according to the present invention includes: any of the above described actuators; a laser light source configured to output a laser beam; a light-receiving element; an optical assembly configured to reflect the laser beam at the mirror and project the reflected laser beam to the outside, guide incident light incident from the outside, to the light-receiving element; and an object detecting assembly configured to detect a distance to an object located along an optical path of the projected laser beam and a direction in which the object is located, based on a projection timing and a projection direction of the laser beam and a timing of a light detection signal output by the light-receiving element.

The object detecting apparatus preferably includes: a speed detecting circuitry configured to detect a rotation speed of the mirror; and a pulse controller configured to control a pulse interval of the laser light source based on the rotation speed detected by the speed detecting circuitry.

Preferably, a third magnet is disposed at an end of the mirror of the actuator on an opposite side to the movable magnet side, and the speed detecting circuitry comprises a magnetic sensor facing the third magnet, and configured to detect the rotation speed of the mirror based on change in magnetism detected by the magnetic sensor.

Preferably, the magnetic sensor is a magnetoresistive sensor that detects direction of a magnetic field with a magnetoresistive element.

The present invention can be embodied not only by the above described embodiments, but also by any other aspect such as an apparatus, a system, a method, a program, or a storage medium on which a computer program is stored.

According to the present invention as described above, it is possible to enable a structure to implement a scanning, in which the projection direction of a light beam periodically changes, with low power consumption and high durability.

BRIEF DESCRIPTION OF DRAWINGS

FIG. 1 is a block diagram illustrating principal configuration related with an embodiment of an object detecting apparatus 10 according to the present invention with focus on the functions thereof.

FIG. 2 is an illustration to explain the principle of object detection in the object detecting apparatus 10.

FIG. 3 is an exploded perspective view illustrating configurations of main constituent elements of the object detecting apparatus 10.

FIG. 4 is a perspective view illustrating an external appearance of the object detecting apparatus 10.

FIG. 5 is a view showing schematic appearance and arrangement of actuators 300, 380.

FIG. 6A to FIG. 6D are exploded perspective views showing components constituting the actuator 300 and an outline of assembly process thereof.

FIG. 7 is an exploded perspective view illustrating components constituting a movable member 320 of the actuator 300.

FIG. 8 is a perspective view showing an overall structure of the movable member 320 for illustrating the function of the mirror unit 301.

FIG. 9 is a cross-sectional view showing a cross section of the actuator 300 shown in FIG. 6D by a chain line as seen from an arrow M.

FIG. 10 is an explanatory view of the centroid of mass of the entire movable member 320.

FIG. 11 is a view showing a comparative example of the movable member.

FIG. 12 is a view showing a structure of a structural diagram of a modified example of a mirror unit.

FIG. 13 is a view showing schematic appearance and arrangement of actuators 300, 380.

FIG. 14 is a perspective view showing structure of an actuator 400.

FIG. 15 is an exploded perspective view of the actuator 400.

FIG. 16 is an exploded perspective view of the actuator 400 in more detail than FIG. 15.

FIG. 17 to FIG. 17C are views for illustrating the principle of reciprocating rotation of the actuator 400.

FIG. 18 to FIG. 18C are other views for illustrating the principle of reciprocating rotation of the actuator 400.

FIG. 19 is a perspective view of an actuator 400', corresponding to FIG. 14.

FIG. 20 is an exploded perspective view of the actuator 400', corresponding to FIG. 15.

FIG. 21 is an exploded perspective view of the actuator 400', corresponding to FIG. 16.

FIG. 22A to FIG. 22C are views for illustrating the principle of reciprocating rotation of the actuator 400', respectively corresponding to FIG. 18A to FIG. 18C.

FIG. 23A to FIG. 23C are views showing structures of modified examples of a yoke in the actuator 400.

FIG. 24A to FIG. 24C are views showing structures of modified example of a yoke in the actuator 400'.

FIG. 25 is a graph illustrating the relation between the scan angle of the mirror unit 301 and the absolute value of the scanning angular velocity.

FIG. 26 is a chart illustrating an example of a drive signal of an LD module 21.

FIG. 27 a view illustrating an example of spots formed by projected light L2 on primary scanning lines when the drive signal of FIG. 26 is used.

FIG. 28 is a view showing a configuration of a control circuitry for controlling the interval of pulses of the drive signal of the LD module 21 with surrounding circuits.

FIG. 29 is a chart illustrating an example of a drive signal of the LD module 21 generated by the circuitry of FIG. 28.

FIG. 30 is a view illustrating an example of spots formed by the projected light L2 on the primary scanning lines when the drive signal of FIG. 29 is used.

FIG. 31 is a perspective view showing structure of an actuator 400", corresponding to FIG. 14.

FIG. 32 is a view showing a configuration of a control circuitry for controlling the interval of pulses of the drive signal of the LD module 21 with surrounding circuits, in the case of using the actuator 400".

FIG. 33A to FIG. 33C are views corresponding to FIG. 17A to FIG. 17C respectively, for explaining the reciprocating rotation of the actuator 400 in an example adopting a magnet or magnets as ferromagnetic material.

FIG. 34 is a view, corresponding to FIG. 23A to FIG. 24C, showing a configuration example of a magnet corresponding to the example in FIG. 33.

FIG. 35 is a view, corresponding to FIG. 23A to FIG. 24C, showing another configuration example of magnets corresponding to the example in FIG. 33.

DESCRIPTION OF EMBODIMENTS

The embodiments of the present invention will be described with reference to the related drawings.

1. Overall Configuration of an Object Detecting Apparatus (FIG. 1 to FIG. 4)

First, the overall configuration of the object detecting apparatus disclosed as an embodiment of the invention will be described in FIG. 1 and FIG. 2 with the explanation focusing on the principal configuration and their functions thereof. FIG. 1 is a block diagram illustrating the principal configuration of the object detecting apparatus focusing on the functions thereof. FIG. 2 is an illustration to explain the principle of the object detection in the object detecting apparatus.

The object detecting apparatus 10 according to an embodiment of the present invention is configured to: project a laser beam outward, detect the laser beam reflected by an external object and thereafter returned back to the object detecting apparatus 10, and thereby detect a distance to the object located along the optical path of the laser beam and the direction of the object based on the time difference between the projection timing of the laser beam and the detection time of the reflected light. As shown in FIG. 1, the object detecting apparatus 10 includes a light projecting unit 20, a scanning assembly 30, a light reception unit 40, a front-end circuitry 51, a Time-to-Digital Converter (TDC) circuitry 52, a processor circuitry 53, and an input/output unit 54.

The light projection unit 20 is configured to project a laser beam outward, and includes an LD (laser diode) module 21, a laser drive circuitry 22, and a collimating lens assembly 23.

The LD module 21 is a laser light source that outputs laser light according to a drive signal applied from the laser drive circuitry 22. Herein, a light source having a plurality of light emitting points is used to improve the output intensity, but the number of light emitting points may also be one. The wavelength of the laser is not particularly limited. For example, near-infrared light is preferred. The laser light is an example of a light beam.

The laser drive circuitry 22 is configured to generate a drive signal for lighting the LD module 21 at a specific timing, based on a parameter supplied from the processor circuitry 53 and apply the drive signal to the LD module 21. The LD module 21 is intermittently lighted by a pulse signal waveform.

The collimating lens assembly 23 is configured to transform the laser light output by the LD module 21 into a general collimated light beam. In this embodiment, a collimator lens composed of a convex lens is used, and the focal point of the convex lens is aligned to the center position of the plurality of light emitting points of the LD module 21.

In addition, the laser beam L1 formed by the collimating lens assembly 23 passes through a light transmitting area 41*a* of a mirror 41 of the light reception unit 40, is reflected by a mirror 31 of the scanning assembly 30, and transmits outward as the projected light L2.

The scanning assembly 30 is configured to deflect the laser beam projected by the light projecting unit 20 to scan within a specified field of view (FOV) 70, and includes an actuator 32 with the mirror 31. The actuator 32 periodically changes the deflecting direction of the projected light by periodically changing the direction of the mirror 31 located on the optical path of the laser beam.

In addition, although only one actuator 32 is shown in FIG. 1, as shown in FIG. 5, the actuator 32 includes two actuators 300, 400 that actuate the mirror to oscillate around different axes, respectively. The actuator 300 scans along the primary scan direction and therefore forms a primary scanning (Horizontal) line 71*a*, and the actuator 400 changes the orientation of the mirror generally at the end of the primary scanning line to form a secondary scanning (Vertical) line 71*b*, thus adjusts the scanning position in the secondary scanning direction.

Since the LD module 21 is intermittently fired, the scanning lines 71 are actually not continuous lines but a series of discrete beam spots.

The light projecting unit 20 and the scanning assembly 30 constitute a light scanning apparatus.

The light reception unit 40 is configured to detect light incident from the external of the object detecting apparatus 10, and includes the mirror 41, a collective lens 42, a light-receiving element 43, and an aperture 44. The light to be detected by the light reception unit 40 is supposed only those reflected light of the laser beam projected from the object detecting apparatus 10 and thus reflected and returned back to the object detecting apparatus 10. The laser beam is scattered on an object surface, and only the angular portion reflected in a direction opposite to the optical path when the light is projected is returned back to the object detecting apparatus 10 as returned light L3. The returned light L3 returns back along the retro-reflective direction which is substantially the same but the reverse path to the projected light L2 and reaches the mirror 41 as the returned light L4.

The mirror 41 is a fixed mirror including a light transmitting area 41*a* through which the laser beam projected by the light projecting unit 20 passes, and the mirror 41 is configured to guide the returned light L4 to the light-receiving element 43. At the position of the mirror 41, the returned light L4 is occupying much wider area than the laser beam L1, therefore the proportion of the returned light L4 out of the light-transmitting area 41*a* is incident to the light-reflective area of the mirror 41 and thereafter reflected toward the light-receiving element 43.

The collective lens 42 collects the returned light L4 reflected by the mirror 41 and forms an image of such incident light on a specific focal plane.

The light-receiving element 43 is a light detecting element that outputs a detection signal corresponding to the intensity of light falling on its light-receiving surface. In this embodiment, a silicon photomultiplier (SiPM) is used as the light-receiving element 43. This will be described in detail later.

The aperture 44 is arranged on the focal plane of the collective lens 42, and blocks light falling on the area out of an opening area thereof to prevent unwanted light from entering the light-receiving element 43.

The mirror 41, the collective lens 42, and the aperture 44 constitute a light receiving optical assembly.

The front-end circuitry 51 is configured to shape the detection signal output by the light-receiving element 43 into a waveform preferred for timing detection in TDC circuitry 52.

TDC circuitry 52 is a circuitry configured to form, based on the drive signal provided by the laser drive circuitry 22 and the shaped detection signal provided by the front-end circuitry 51, a digital output representing a time difference between timing t0 of firing pulse of the laser beam L1 to be projected and timing t1 of pulse of the corresponding returned light L4.

Between a pulse of the projected light and a pulse of the returned light, the time delay occurs when the projected light reaches the object along the optical path and returns to the object detecting apparatus 10. Thus, based on the time delay $\Delta t$, the distance s from the object detecting apparatus 10 to the object can be calculated according to $s=c(\Delta t)/2$, as shown in FIG. 2, where c is the velocity of light. In more accurate meaning, s is the length of an optical path from the object to the light-receiving element 43.

The processor circuitry 53 is configured to control the operations of configurations illustrated in FIG. 1. The processor circuitry 53 may be constructed by a general-purpose computer including a CPU, an ROM, a RAM, or the like and executing software, or by dedicated hardware, or by a combination thereof. For example, the processor circuitry 53 calculates the distance to the object based on the output signal of the TDC circuitry 52, and calculates the direction of the object based on the scanning timing of the scanning assembly 30 (the deflecting direction of the projected light L2) at the detection timing of the returned light. As described in detail later, the processor circuitry 53 also controls the pulse interval of the LD module 21 based on the orientation of the mirror 31 in the scanning assembly 30.

The input/output unit 54 is configured to input and output information from/to peripherals. The input and output of information here includes wired or wireless communication with peripheral apparatus, receipt of user operations with buttons, touch panels, or the like, and indication to users with displays, lamps, buzzers, vibrators, or the like. The information output from the input/output unit 54 may be information related to the detected object (for example, raw data of the distance and/or direction, or information indicating detection of an object having a specified size, position, moving speed and the like obtained based on the raw data), or information related to the operation state or setting status of the object detecting apparatus 10. The information input by the input/output unit 54 may be, for example, information related to the operation setting of the object detecting apparatus 10.

The input/output unit 54 may communicate with, for example, a vehicle with an autonomous driving system or a mobility object such as a drone device. If the information of the object detected by the object detecting apparatus 10 is provided to the autonomous driving system, the autonomous driving system can plan a driving route with reference to the information to avoid the detected object.

The present invention may also be implemented as a system including the object detecting apparatus 10 and its communication counterpart is such as a vehicle, a drone, or an airplane.

The outline of structure of the object detecting apparatus 10 will be described with reference to FIG. 3 and FIG. 4. FIG. 3 is an exploded perspective view of main constituent elements of the object detecting apparatus, and FIG. 4 is a perspective view illustrating an external appearance of the object detecting apparatus.

As shown in FIG. 3 and FIG. 4, the object detecting apparatus 10 has a housing formed of a top cover 61 and a rear cover 62 coupled through two cover clips 63, 63. The top cover 61 has a window for allowing the projected light L2 to pass through, and a protective material 64 that prevents dust from intruding into the object detecting apparatus 10 and is transparent to the wavelength of the projected light L2 is embedded into the window.

The respective constituent elements shown in FIG. 1 are contained inside the housing. In addition, the actuator 32 shown in FIG. 1 is shown as two actuators of an actuator 300 for scanning in the primary scanning direction and an actuator 380 for scanning in the secondary scanning direction. The mirror unit 301 is provided in the actuator 300.

The mirror 48, not shown in FIG. 1, is an optical element between the mirror 41 and the collective lens 42 for changing the orientation of the returned light L4. Dotted lines 65 indicate the field of view of the object detecting apparatus 10 (the scanning range of the projected light L2), corresponding to the field of view 70 in FIG. 1. The circuits such as the laser drive circuitry 22, the processor circuitry 53, and the like, and the wires between mentioned assembly/units are omitted in FIG. 3 to simplify the drawing.

Described above is the overall structure. Hereinafter, several constituent elements of the object detecting apparatus 10 will be described, respectively.

2. Scanning Assembly 30 and Actuator 300 (FIG. 5 to FIG. 11)

It has been described that the scanning assembly 30 includes actuators 300 and 380. The actuator 300 has a characteristic structure, which will be described.

FIG. 5 shows enlarged appearance and arrangement of the actuators 300, 380 in FIG. 3.

As shown in FIG. 5, the structures of the actuator 300 and the actuator 380 are substantially different.

The actuator 380 is used for deflecting the projected light L2 in the secondary scanning direction, so high-speed motion is not required, and an actuator that rotates the mirror around the physical axis is available. The actuator 380 is configured in such a way that a mirror 381 is fixed to a shaft 382 and the shaft 382 is inserted into a holder 383 such that the shaft 382 is rotatably attached to the holder 383. By the magnetic interaction of the permanent magnet attached to the rear side of the mirror 381 and a static coil (not shown), the mirror 381 rotates around the rotation axis 384 at the center of the shaft 382, and performs reciprocal scanning within a specified angle range corresponding to the voltage applied to the coil. The motion of the mirror may also be halted at a specific angle within the scanning range by adjusting the strength of the voltage.

This type of actuator can be classified as a galvanometer mirror. Generally, such structure in which a mirror mounted at one end of the shaft is rotated by applying a force to the other end of the shaft is widely used. However, like the actuator 380, even if the force is applied to the shaft at the same longitudinal section as the mounting position of the mirror, the actuator can also be driven based on the same principle.

On the other hand, since the actuator 300 is used for deflecting the projected light L2 in the primary scanning direction, high-speed motion is required, and durability for sustaining the high-speed motion for a long time is also required. Therefore, a new actuator that meets such purposes is adopted as the actuator 300.

The specific structure of the actuator 300 will be described in detail with reference to FIG. 6 to FIG. 10. As an outline explanation, the actuator 300 is configured such that the mirror unit 301 is fixed to a first side of the torsion spring 302 with a straight folded peak where the mirror 301 is implemented across the folded peak, and the ends of the torsion spring 302 are fixed to a top yoke 314 as a support member. By magnetic interaction between the permanent magnet coupled to a second side of the torsion spring 302 and a static coil, the torsion spring 302 and the mirror unit 301 rotate around a rotation axis 304 approximately located at the center of the folded peak of the torsion spring 302, and reciprocally scan within a specified angle range corresponding to the voltage applied to the coil.

The scanning assembly 30 reflects and deflects the laser beam L1 through the mirror unit 301 and the mirror 381 driven by the actuators 300 and 380 respectively, thereby projecting the projected light L2 outward along the scanning lines 71 shown in FIG. 1.

Note that an actuator having the same structure as the actuator 300 may be adopted as an actuator for scanning in the secondary scanning direction.

The structure and operation principle of the actuator 300 will be described in more detail with reference to FIG. 6 to FIG. 12.

FIG. 6A to FIG. 6D are exploded perspective views showing components constituting the actuator 300 and an outline of assembly process thereof, and FIG. 6D is also a perspective view of the actuator 300 completed in the final process. FIG. 7 is an exploded perspective view illustrating components constituting a movable member 320 of the actuator 300. FIG. 8 is a perspective view of an entire structure of the movable member 320 for illustrating the function of the mirror unit 301. FIG. 9 is a cross-sectional view showing a cross section of the actuator 300 shown in FIG. 6D (a cross section with a plane that passes through the vicinity of the center of planar arms 302b and is perpendicular to the longitudinal direction of a folded peak 302c) as seen from an arrow M. To simplify the drawing, a coil assembly 313 is omitted and a winding structure of the coil is schematically shown in FIG. 9. FIG. 10 is an explanatory view of the centroid of mass of the entire movable member 320. FIG. 11 shows a configuration of a comparative example thereof, FIG. 12 shows a configuration of a modified example thereof, and details will be described later.

As shown in FIG. 6A, the actuator 300 includes a core yoke 311, a frame yoke 312, a coil assembly 313, a top yoke 314, and the movable member 320.

The frame yoke 312 and the top yoke 314 are made of magnetic substance and form a wall structure surrounding the coil. The frame yoke 312 and the top yoke 314 are fixed with each other by four screws 315 penetrating four pairs of screw holes 312b, 314b to hold the coil assembly 313 inside.

The coil assembly 313 includes a driving coil 316 and a sensing coil 317 wound around a non-magnetic bobbin 313a as shown in FIG. 9, and is covered with a protective cover 313c. A through hole 313b which allows the core section 311a of the core yoke 311 passing through is formed in the center section of the bobbin 313a. The protective cover 313c is provided with a terminal for applying a drive signal to the driving coil 316 and a terminal for outputting a signal generated in the sensing coil 317 at positions not interfering with the magnetic wall.

The core yoke 311 includes a core section 311a made of a ferro-magnetic body that serves as a core of the driving coil 316 and the sensing coil 317.

The core section 311a of the core yoke 311 is inserted into a corresponding hole 312a of the frame yoke 312 as shown in FIG. 6B, then the core section 311a is inserted into the through hole 313b of the coil assembly 313 to position the coil assembly 313 as shown in FIG. 6C, and the top yoke 314 and the frame yoke 312 are fixed with each other by the screws 315 as shown in FIG. 6D.

The core section 311a is fixed to the frame yoke 312 in the steps of FIG. 6A to FIG. 6D, and the coil assembly 313 is fixed to the core section 311a (and the frame yoke 312) in the steps of FIG. 6B to FIG. 6C. It is also preferred to perform these assembly process by other types of screw not mentioned above, or by welding or bonding process, or by press fit process where a member inserted is slightly larger than a space on a reception side, or by a combination with these manufacture processes.

In FIG. 6B and FIG. 6C, the movable member 320 is omitted to save the drawing space.

As shown in FIG. 7, the movable member 320 includes a permanent magnet 321 in addition to the mirror unit 301 and the torsion spring 302.

The torsion spring 302 is formed by folding a metal plate by press manufacture, bending manufacture, or the like. The torsion spring 302 is in a folded shape with a straight folded peak 302c with a V-shaped cross section. Planar arms 302b respectively protruding to both sides so as to be across the folded peak 302c are formed near the longitudinal middle section of the folded peak 302c, and planar arms 302a respectively protruding to both sides so as to be across the folded peak 302c are formed at both longitudinal ends of the folded peak 302c respectively. The folded peak 302c and the planar arms 302a and 302b are composed as a unity. By forming those portions by bending a single metal plate, the torsion spring 302 with sufficient strength at low manufacturing cost can be realized.

All of the planar arms 302a at both longitudinal ends and the planar arms 302b are on the same plane in the natural state. However, when a force of rotating around the folded peak 302c is applied to the planar arms 302b while the planar arms 302a at both longitudinal ends are fixed on the same plane, the folded peak 302c is twisted, and the planar arms 302b are rotated around the folded peak 302c. When the application of the force is stopped, the torsion of the folded peak 302c is released by the restoring force of the spring, and the planar arms 302b returns to the same plane as the planar arms 302a.

The permanent magnet 321 is fixed to a side of the planar arms 302b opposite to the folded peak 302c so that its N-pole 321n and S-pole 321s are located at the separated sides across the folded peak 302c. The positions of the N-pole 321n and the S-pole 321s may also be opposite to the figure. The permanent magnet 321 may be fixed to the planar arms 302b by any method such as bonding or welding.

As shown in FIG. 7, the mirror unit 301 is formed by partially overlapping and bonding a first mirror 301a and two second mirrors 301b. The mirror unit is furtherly fixed to the torsion spring 302 by bonding the two second mirrors 301b to the planar arms 302b respectively on the surfaces towards the folded peak 302c. An adhesive may be adopted for the bonding, but the type with lower curing shrinkage is preferred.

As shown in FIG. 9, the first mirror 301a does not contact with the top of the folded peak 302c, and there is a small gap between them. That is, the first mirror 301a is coupled only to the second mirrors 301b, and the second mirrors 301b serve as spacers. Since the folded peak 302c is slightly deformed when the torsion spring 302 is twisted, a certain space is preferably to ensure the folded peak 302c not interfering with surrounding components even if the deformation occurs.

The movable member 320 is furtherly fixed to a movable member support part 314a of the top yoke 314 in a step illustrated between FIG. 6C and FIG. 6D. The components shown in FIG. 7 are assembled together in advance. The fixation may be performed by any method. For example, the planar arms 302a may be fixed to the movable member support part 314a by screws (not shown), or the planar arms 302a may be bonded or welded to the movable member support part 314a, or the planar arms 302a may be respectively inserted into slits formed in the movable member support part 314a.

In a state where the movable member 320 is fixed to the top yoke 314, the planar arms 302b of the torsion spring 302 and the permanent magnet 321 are opposed to the coil assembly 313 through an opening 314c of the top yoke 314. More specifically, as shown in FIG. 9, one end of the axis of the driving coil 316 disposed in the coil assembly 313 faces the midpoint among the N-pole 321n and the S-pole 321s of the permanent magnet 321. The driving coil 316 is disposed on a side opposite to the torsion spring 302 as viewed from the permanent magnet 321.

When the driving coil 316 is powered on in this state, for example, when the end facing the permanent magnet 321 becomes an N-pole, the S-pole 321s of the permanent magnet 321 is pulled close to the driving coil 316, the N-pole 321n is pushed away from the driving coil 316. Therefore the force interacting with the permanent magnet 321 shall be the clockwise direction if seen in the cross-sectional view of FIG. 9. This force is also applied to the planar arms 302b of the torsion spring 302, and the torsion spring 302 is rotated and twisted clockwise around the virtual rotation axis 304 near the center of the cross section of the folded peak 302c. Thereby, the mirror unit 301 coupled to the planar arms 302b also rotates clockwise around the rotation axis 304.

The rotation is stopped at a position where the magnetic force generated between the driving coil 316 and the permanent magnet 321 is balanced with the restoring force of the torsion spring 302. The speed and stop position of the rotation can be adjusted by changing the intensity of current applied to the driving coil 316.

After the permanent magnet 321 and the mirror unit 301 rotate clockwise to an appropriate position, when the direction of current applied to the driving coil 316 is reversed, the end facing the permanent magnet 321 becomes an S-pole, the N-pole 321n of the permanent magnet 321 is pulled close to the driving coil 316, the S-pole 321s is pushed away from the driving coil 316. Therefore, the force interacting with the permanent magnet 321 shall be the counterclockwise direction if seen in the cross-sectional view of FIG. 9. This force is also applied to the planar arms 302b of the torsion spring 302 in the same manner as in the case of the clockwise direction, and the torsion spring 302 is rotated counterclockwise around the rotation axis 304 and twisted in the opposite direction. Thereby, the mirror unit 301 coupled to the planar arms 302b also rotates counterclockwise around the rotation axis 304.

By reciprocally changing the direction of voltage or current of the drive signal applied to the driving coil 316, as shown by arrows V in FIG. 9, the mirror unit 301 performs the rotation in the clockwise and counterclockwise direction reciprocally within a certain angular range around the rotation axis 304. That is, the mirror unit 301 can be oscillated along a predetermined moving path. Accordingly, periodical deflection of the laser beam L1 required for scanning in the primary scanning direction as described in FIG. 1 can be realized.

In consideration of the lifespan of the torsion spring 302, the oscillation is preferably symmetrical with respect to the natural state. But this is not essential. For example, the oscillation can also be performed within an angular range with one end thereof at a position near the natural state by periodically turning on and off the voltage applied to the driving coil 316. The mirror unit 301 can be oscillated within an arbitrary angular range by periodically changing the voltage or current applied to the driving coil 316 within an appropriate range, as long as the angular range is in the rotatable limit of the torsion spring 302.

However, as shown in FIG. 8, in the mirror unit 301 of the movable member 320, the reflecting surface (first reflecting surface) of the first mirror 301a reflects and deflects the laser beam L1 projected by the collimating lens assembly 23 to form projected light L2. On the other hand, both the reflecting surface of the first mirror 301a and the reflecting surfaces (second reflecting surface) of the second mirrors 301b reflect the returned light L3 from the outside to form the returned light L4 to be guided to the light reception unit 40 along the same optical axis as that of the laser beam L1.

Since the spot of the laser beam L1 is small, the size of the first mirror 301a to form the projected light L2 may be also small, as long as the laser beam L1 can be received within the first reflecting surface in the entire possible angular range of rotation of the mirror unit 301.

On the other hand, since the returned light L4 is a part of the projected light L2 scattered on an object to be detected and returned back, it is preferable that the returned light L4 within the extended acceptable area is guided to the light reception unit 40, so as to improve the detection sensitivity. Therefore, the total size of the first mirror 301a and the second mirrors 301b is preferably designed as large as possible.

In the mirror unit 301, the first mirror 301a and the second mirrors 301b are separate entities both to ensure a large reflection area and to improve the energy efficiency of rotation of the mirror unit 301, and furtherly achieve high-speed rotation, that is, to achieve high-speed scanning with low power consumption. This point will be further described.

Firstly, as in the comparative example shown in FIG. 11, we assume that one mirror 501 with enough size is placed across the vicinity of the top of the folded peak 302c. In this case, spacers to support the mirror 501 on the planar arms 302b of the torsion spring 302 are necessary, but they are omitted in FIG. 11.

In such a structure, a large mass of the mirror 501 is positioned far away from the rotation axis 304 on the side of the folded peak 302c of the torsion spring 302, and thus the inertia moment of the movable member 320 related to the rotation around the rotation axis 304 becomes large.

To reduce the inertia moment, it is thought to avoid placing the mirror 501 over the folded peak 302c, but preferably placing the mirror 501 on the planar arms 302b which is closer to the rotation axis 304. That is, the mirror 501 is preferably placed at the positions of the second mirrors 301b. However, the mirror should not interfere with the folded peak 302c. Accordingly, if the mirror 501 is simply divided into two mirrors and respectively placed at the positions of the second mirrors 301b, the end edge of the mirrors is positioned farther from the rotation axis 304 than the case of the one mirror 501, which results in larger inertia moment in total.

In order to solve such a problem, the mirror unit 301 is divided into a first mirror 301a across the folded peak 302c and second mirrors 301b disposed on the planar arms 302b, so that the mirror is placed close to the rotation axis 304 as a whole while an enough area is still ensured.

According to this configuration, the larger second mirrors 301b are close to the rotation axis 304, and the inertia moment related to the rotation around the rotation axis 304 can be reduced as compared with the configuration of FIG. 11.

That is, the sizes of the second mirrors 301b can be reduced by an amount equivalent to the size of the first mirror 301a, so that the distances from the rotation axis 304 to each end edge of the second mirrors 301b do not become too long. Although the first mirror 301a should still be placed at a position away from the rotation axis 304 to a certain extent to avoid interfering with the folded peak 302c, as long as it crosses away the folded peak 302c, it can be directly fixed on the second mirrors 301b without occupying too much space, so that the distance from the rotation axis 304 to the ends of the first mirror 301a can be reduced. In such circumstance, a distribution of the mass can be prevented from being placed at a position away from the rotation axis 304, and the inertia moment can be reduced.

Thereby, the energy required to twist the torsion spring 302 and rotate the mirrors can be suppressed low. In the torsional oscillating system, the resonant frequency is proportional to the one-half power of the value obtained by dividing the torsional rigidity K of the spring by the inertia moment I. Thus, if the inertia moment is reduced, the resonance frequency of the movable member 320 can be improved, and high-speed scanning can be achieved.

The first mirror 301a and the second mirrors 301b are respectively formed in a rectangular shape with their longitudinal directions along the rotation axis 304 to further reduce the inertia moment.

In order to improve the resonant frequency of the movable member 320, a spring with larger spring constant may be used as the torsion spring 302. However, although a thicker metal plate has a large spring constant, the manufacturing error becomes large when the thickness increases. Therefore, from the manufacture point of view, it is much preferable to use the mirror unit 301 in the shape described above to improve the resonant frequency rather than simply increasing the spring constant.

In order to achieve the above merits, if the mirror unit 301 can be separated into a first planar mirror 301a and second planar mirrors 301b, the mirror unit 301 can be easily manufactured. But this is not necessary. The first mirror 301a and the second mirrors 301b may also be integrated to be unified, and a stepped mirror with steps between the first reflecting surface and the respective second reflecting surfaces may be adopted. A mirror 301' having a cross section shown in FIG. 12 in which a first reflecting surface 301a1 and second reflecting surfaces 301b1 are smoothly connected may also be adopted.

In short, in the case where the plane including the second reflecting surface is closer to the rotation axis 304 of the torsion spring 302 than the plane including the first reflecting surface, as the example shown in FIG. 6 to FIG. 10, lower inertia moment can be realized, and the resonant frequency can be improved.

On the basis of the above, since the centroid of mass of the second mirrors 301b of the movable member 320 is located substantially on the rotation axis 304, by placing the centroids of mass of the remaining members, that is, the first mirror 301a, the permanent magnet 321 and the torsion spring 302, on the rotation axis 304 by adjusting the size and weight of each member, the centroid of mass 305 of the entire movable member 320 can be placed on the rotation axis 304 as shown in FIG. 10.

By placing the centroid of mass of the movable member 320 substantially on the rotation axis 304, unnecessary vibration can be eliminated when the mirror unit 301 rotates with the torsion of the torsion spring 302, so that the resonant frequency can be further improved.

Even if the centroid of mass of the movable member 320 is not accurately located on the rotation axis 304, the deviation can be ignored as long as the vibration caused by the deviation can be ignored. Since the mirror unit 301 has a large part of the mass of the movable member 320, if only the centroid of mass of the mirror unit 301 is placed on the rotation axis 304 or slightly shifted to the opposite side of the permanent magnet 321, the centroid of mass of the movable member 320 can be placed substantially on the rotation axis 304.

If the centroid of mass of the cross section of the movable member 320 in a plane perpendicular to the rotation axis 304 is located on the rotation axis 304 at all points on the rotation axis 304, the effect of improving the resonant frequency is particularly remarkable. However, as long as the centroid of mass of the entire movable member 320 is located at surrounding position on the rotation axis 304, a sufficiently meaningful effect can be achieved.

In the actuator 300, the end portions of the movable member 320 are fixed to the top yoke 314 respectively, but the portion near the actually moving planar arms 302b floats in the air. Accordingly, no friction between the components occurs during the oscillation, and thus even if the actuator 300 is continuously driven for a long time, heat or wear is generally not produced. Therefore, high durability can be obtained.

Since the coil assembly 313 is surrounded by the magnetic top yoke 314 and frame yoke 312, leakage of magnetic force generated in the driving coil 316 can be prevented, and high driving efficiency can be obtained. However, such a magnetic wall structure to house the coil assembly 313 is not essential.

The material of the torsion spring 302 may be, for example, stainless steel or phosphor bronze. Besides, any material that can form an elastic spring may be used. It is discovered by simulation by the inventor that a larger spring constant can be obtained and the resonant frequency of the torsion spring 302 can be improved through the V-shaped cross section of the folded peak 302c. Accordingly, the folded peak 302c with the V-shaped cross section is adopted in this embodiment.

However, the cross section is not limited to the V-shape. Other shapes such as n-shape, U-shape, or M-shape, W-shape, or a hollow structure with a thin wall without an opening boundary is also preferred, as long as the specific shape allows the torsion spring to function.

The structure with the straight folded peak 302c can improve the rigidity in the direction orthogonal to the rotation axis as compared with the torsion spring of a planar structure. The enhancement of the rigidity is very useful to a stable scanning in an environment where vibration always occurs, for example, on a vehicle, and also to guarantee durability of the swing structure.

The invented torsion spring with the folded peak 302c is a three-dimensional structure and is relatively thick as an entity. Therefore, the torsion spring is easily manufactured simply by folding a planar substrate. On the other hand, it is difficult to form a torsion spring of a folded peak 302c with an enough height by wafer deposition through MEMS (Micro Electro Mechanical Systems) process.

The driving coil 316 is disposed in a direction perpendicular to the planar arms 302b in natural state in the example of FIG. 9. However, the direction is not limited to that in FIG. 9 as long as one end of the axis thereof is opposed to the midpoint among the N-pole 321n and the S-pole 321s of the permanent magnet 321. For example, if the axis is parallel to the folded peak 302c, oscillation of the mirror unit 301 can be also realized similarly to the configuration of FIG. 9.

It is not essential that the driving coil 316 is housed in the coil assembly 313 or wound on the bobbin. The driving coil 316 may also be directly wound on the core section 311a.

Further, the sensing coil 317 is provided to control the pulse interval of the laser beam L1 as described later with reference to FIG. 25 to FIG. 30, and is not required if the control is not performed.

The permanent magnet 321 may also be replaced with an electric magnet that is powered on when the mirror is driven. However, the permanent magnet 321 is preferable in merit of simple structure, small assembly error, and lower noise.

3. Another Structural Embodiment of Actuator
(FIG. 13 to FIG. 23C)

The actuator 300 adopted in the scanning assembly 30 in the above described embodiment may be substituted with another actuator where the operating principle is completely different from the actuator 300. The actuator 400 will be described as an example of said alternative actuators.

FIG. 13 shows a schematic appearance and arrangement of the actuators 400 and 380 as illustrated in FIG. 5 while only substituting the actuator 300 to the actuator 400.

Briefly, the actuator 400 is constructed such that a mirror 401 is fixed to a permanent magnet 410 and the permanent magnet 410 is held by bearings 403, 405. By magnetic interaction among the permanent magnet 410, a soft magnetic material as a yoke 430 is disposed around the permanent magnet 410, and a driving coil 420 (see FIG. 14) is disposed between the permanent magnet 410 and the yoke 430. When the current is applied to the driving coil 420, with the magnetic interaction between the permanent magnet 410 and the driving coil 420, both the permanent magnet 410 and the mirror 401 can reciprocally rotate as one unit within a specific angle range around a rotation axis 404 which is passing through the center of the permanent magnet 410.

The scanning assembly 30 reflects and deflects the laser beam L1 by the mirror 401 driven by the actuator 400 and the mirror 381 driven by the same actuator 380 as that shown in FIG. 5, and thus projects the projected light L2 outward along the scanning lines 71 shown in FIG. 1.

Note that an actuator with the same structure as the actuator 400 may be adopted as an actuator for scanning in the secondary scanning direction.

The structure of the actuator 400 will be described in more detail with reference to FIG. 14 to FIG. 16.

FIG. 14 is a perspective view of the actuator 400. FIG. 15 and FIG. 16 are exploded perspective views of the actuator 400, respectively. FIG. 16 shows a state where the components around the permanent magnet 410 are in the exploded view compared with FIG. 15.

As shown in FIG. 14 to FIG. 16, the actuator 400 includes the mirror 401, a mirror holder 402, the bearing 403, the bearing 405, a magnet holder 406, the permanent magnet 410, the driving coil 420, and the yoke 430.

The mirror 401 is a planar mirror with a reflecting surface for reflecting the laser beam L1 and the returned light L4.

The mirror holder 402 fixes the mirror 401 to the bearing 403 so as to rotate with the movement of the permanent magnet 410 and makes the centroid of mass of the mirror 401 located on the central axis (rotation axis) of the permanent magnet 410.

In the example of FIG. 14, the upper end of the cylindrical permanent magnet 410 is pressed into a thin-walled portion 402*b* to insert the permanent magnet 410 therein, whereby the mirror holder 402 is fixed to the permanent magnet 410. Thereafter, a mirror holding portion 402*a* is inserted through an inner ring 403*a* of the bearing 403 from the lower side to the upper side as illustrated in the figure and then pressed into the inner ring 403*a*, and thereby the mirror holder 402 is embedded and fixed to the inner ring 403*a*. The mirror 401 is bonded to the mirror holding portion 402*a*.

The bearing 403 and the bearing 405 hold the permanent magnet 410 respectively to rotate around its central axis.

The permanent magnet 410 is fixed to the bearing 403 via the mirror holder 402 in the same way as described above. The permanent magnet 410 is fixed to the bearing 405 by pressing an end thereof to a magnet holding portion 406*a* of the magnet holder 406 formed to embed the permanent magnet 410 therein, whereby the permanent magnet 410 is integrated with the magnet folder 406, and then pressing a bearing connecting portion 406*b* of the magnet holder 406 into an inner ring 405*a* of the bearing 405.

As described above, the permanent magnet 410 and the mirror 401 are integrally held by the bearings 403, 405 to be rotatable together with the inner ring 403*a* and the inner ring 405*a*.

The driving coil 420 is fixed to the inner side of the yoke 430 by bonding, welding, or the like, and the yoke 430 is fixed to the bearing 403 and the bearing 405 respectively by bonding, welding, or the like such that the yoke 430 does not hinder rotation of the inner rings 403*a* and 405*a*.

The fixing methods such as embedding, bonding, and welding described above are only examples, and other methods may be adopted if needed.

In the actuator 400, the permanent magnet 410 is cylindrical, and assuming that the cylinder is divided into two areas by a plane including the central axis thereof, an N-pole 410*n* thereof is located in one area, and an S-pole 410*s* thereof is located in the other area (refer to FIG. 17 and FIG. 18). The N-pole and the S-pole are not at the two longitudinal ends.

The driving coil 420 is provided with a first portion 421 including a wire bundle generally parallel to (the central axis of) the permanent magnet 410 and a second portion 422 which includes a wire bundle generally parallel to the permanent magnet 410. Current flows in opposite directions in the first portion 421 and the second portion 422 when powered on. The two portions 421, 422 are located on opposite sides of the permanent magnet 410. The first portion 421 and the second portion 422 are connected with each other through a first connecting portion 423 and a second connecting portion 424. The first connecting portion 423 and the second connecting portion 424 are respectively wound near the longitudinal ends of the permanent magnet 410 along the surface of the permanent magnet 410.

As shown in FIG. 14, one turn of the driving coil 420 is, for example, ascending in the first portion 421 from bottom to top along the permanent magnet 410, entering the first connecting portion 423 near the upper end of the permanent magnet 410, wound clockwise along the surface of the permanent magnet 410 as viewed from the upper side in FIG. 14, then entering the second portion 422, descending in the second portion 422 from top to bottom along the permanent magnet 410, entering the second connecting portion 424 near the lower end of the permanent magnet 410, wound counterclockwise along the surface of the permanent magnet 410 as viewed from the upper side in FIG. 14, and connected to the first portion 421 of next turn. No wire is disposed at positions opposing the longitudinal end faces of the permanent magnet 410.

The driving coil 420 with such configuration enables current flow in opposite directions on the N-pole 410*n* side and the S-pole 410*s* side through only one coil, so that torques can be simultaneously generated on the N-pole 410*n* side and the S-pole 410*s* side. The current flow in the first connecting portion 423 and the second connecting portion 424 generates no torque against the permanent magnet 410. However, since the wires of the portions 423, 424 are short, little energy loss is caused by the resistance thereof. For these reasons, the torque against the permanent magnet 410 can be generated with high energy efficiency through the driving coil 420.

The driving coil 420 can be easily manufactured only by bending a planar single-core coil into a U shape.

The actuator 400 includes a terminal and a wire for applying a drive signal to the driving coil 420, and the driving coil 420 is not in contact with the permanent magnet 410.

The yoke 430 is a ferromagnetic material disposed outside the driving coil 420, is composed of a first portion 431, a second portion 432 and a third portion 433 respectively formed of a flat plate, and has a cross section which is substantially square but with an opening at one side.

In the actuator 400 of the above configuration, the yoke 430 is disposed in such a way that, on a plane perpendicular to the central axis of the permanent magnet 410, the distance from the central axis of the permanent magnet 410 to the yoke 430 is different according to directions viewed from the central axis of the permanent magnet 410. That is, according to the direction viewed from the permanent magnet 410, the distance between the permanent magnet 410 and the yoke 430 is longer at some direction and shorter at other direction. It can be considered that the distance from the permanent magnet 410 to the yoke 430 is infinite in the direction of the opening side of the square of the yoke 430.

If the yoke 430 is disposed in this manner, when no voltage is applied to the driving coil 420, the N-pole 410*n* and the S-pole 410*s* of the permanent magnet 410 are stopped by the magnetic force toward the direction closest to the yoke 430. In the case where the two poles cannot simultaneously face the "nearest direction", the poles are stopped toward an appropriate equilibrium direction.

In the example of FIG. 14, the permanent magnet 410 is stopped such that one of the N-pole 410*n* and the S-pole 410s approximately face the center of the first portion 431, and the other one approximately faces the center of the second portion 432. Such location is referred to as a "neutral position". When the permanent magnet 410 is slightly rotated from the neutral position by applying voltage to the driving coil 420, the permanent magnet 410 will return to the neutral position if the voltage is turned off. In this meaning, it is said that a restoring force for returning the permanent magnet 410 to the neutral position acts as the actuator 400. That is, the permanent magnet 410 combined with the yoke 430 operates as a magnetic spring with its natural state at the neutral position.

The permanent magnet 410 and the mirror 401 perform reciprocating rotation utilizing the restoring force. Accordingly, if the actuator 400 is driven by a specific driving frequency, for example, driven by the resonant frequency of the movable portion of the actuator 400 or its approximate frequency, high-speed scanning can be achieved with low power consumption compared with a general galvanometer mirror that does not produce a restoring force.

The distance from the permanent magnet 410 to the third portion 433 is preferably longer than the distance to the first portion 431 or the second portion 432. When the distance from the permanent magnet 410 to the third portion 433 is shorter, this orientation does not become a neutral position, because when one pole faces the third portion 433, there is no yoke opposed to the other pole. However, the relationship between the orientation of the permanent magnet 410 and the strength of the restoring force may become locally distorted.

The principle of reciprocating rotation of the actuator 400 will be described with reference to FIG. 17A to FIG. 18C.

FIG. 17A to FIG. 18C schematically show the cross sections of the permanent magnet 410, the driving coil 420, and the yoke 430 on a plane perpendicular to the permanent magnet 410 as viewed from the mirror 401. Hatchings indicating the cross sections are omitted, and only the first portion 431 and the second portion 432 related to the formation of the neutral position are shown among the yoke 430. Arrows B and B' indicate representatives of the orientations of magnetic field lines generated by the permanent magnet 410 in each state. Arrows F and F' indicate the directions of force applied to the permanent magnet 410 in each state. In all cases, the lengths of the arrows do not necessarily correspond to the magnitudes of force.

If the actuator 400 is held with no voltage applied to the driving coil 420, the permanent magnet 410 stops after rotating to the neutral position shown in FIG. 17A and FIG. 18A. The position at which the N-pole 410n and the S-pole 410s are exchanged from the state of FIG. 17A and FIG. 18A is also the neutral position, in which case the same reciprocating rotation can also be performed. However, the explanation here is made assuming that the position of FIG. 17A is the neutral position.

Considering that a voltage is applied to the driving coil 420 from the state of FIG. 17A, FIG. 17B shows that current i flows through the first portion 421 from the front side to the rear side, and current −i conversely flows through the second portion 422 from the rear side to the front side.

In this state, a clockwise magnetic field is formed around the first portion 421, a counterclockwise magnetic field is formed around the second portion 422, and a magnetic field having bottom to top magnetic field lines in the figure is formed nearby the permanent magnet 410. The permanent magnet 410 is subjected to an upward force on the N-pole 410n in the magnetic field, and rotates clockwise. This force can be considered as a reaction of Lorentz force generated by the current flowing through the driving coil 420 within the magnetic field generated by the permanent magnet 410.

Then, when the application of voltage to the driving coil 420 is stopped after the permanent magnet 410 is rotated to some extent as shown in FIG. 17C, the permanent magnet 410 returns to the natural state of FIG. 17A because of the magnetic force between the magnetic poles and the yoke 430.

On the other hand, when voltage in a direction opposite to the case of FIG. 17B is applied to the driving coil 420, and current flows in the opposite direction as shown in FIG. 18B, a magnetic field having top to bottom magnetic field lines in the figure is formed nearby the permanent magnet 410. The permanent magnet 410 is subjected to a downward force on the N-pole 410n in the magnetic field, and rotates counterclockwise.

Then, when the application of voltage to the driving coil 420 is stopped after the permanent magnet 410 is rotated to some extent as shown in FIG. 18C, the permanent magnet 410 returns to the natural state of FIG. 18A (the same state as FIG. 17A) because of the magnetic force between the magnetic poles and the yoke 430.

The above process is repeated by applying a drive signal having a periodically varying voltage or current to the driving coil 420, and thereby the actuator 400 performs reciprocating rotation (oscillation) of the permanent magnet 410 and the mirror 401.

The angular range of the rotation may be symmetrical with respect to the natural state, or may be asymmetrical. For example, the swing can also be performed within a certain angular range with one end thereof at a position near the neutral position by periodically turning on and turning off the voltage applied to the driving coil 420. The mirror 401 can oscillate within an arbitrary angular range by periodically changing the voltage or current applied to the driving coil 420 within an appropriate range.

In this case, when the permanent magnet 410 is stopped at the end of the oscillation range, energy is not required for braking, and turning off the application of voltage to the driving coil 420 is enough. Also when the permanent magnet 410 returns from the end of the oscillation range to the neutral position, voltage is not required. When the permanent magnet 410 is rotated from the neutral position to the end of the oscillation range, it is necessary to apply voltage to the driving coil 420 for overcoming the restoring force to the neutral position. However, even if this point is considered, the actuator 400 can oscillate the permanent magnet 410 and the mirror 401 with low power consumption compared with a galvanometer mirror without restoring force.

If the rotation angle of the permanent magnet 410 is too large while oscillating, the permanent magnet 410 cannot return to the original neutral position when the application of the voltage is stopped, and may return to another neutral position where the N-pole 410n and the S-pole 410s are exchanged. Therefore, the oscillation angular range is preferably not too large. In the example of FIG. 17 and FIG. 18, the permanent magnet 410 should not be rotated up to +90 degrees or −90 degrees or more from the initial neutral position.

In addition, when the displacement from the natural state becomes large, there is also a problem that the energy efficiency will reduce. This is because, when the displacement becomes large, the poles are affected not only by the wires opposed in the natural state but also by the wires on the opposite side. Since the current flows through the wires on the opposite side in the opposite direction, the magnetic force thereof decelerates the rotation.

From these viewpoints, if the angular range of rotation is symmetrical with respect to the natural state, a relatively wider oscillation range can be obtained, and higher energy efficiency can be obtained. Accordingly, the symmetrical oscillation range is preferable.

In the actuator 400 described above, the permanent magnet 410 is cylindrical, but the shape of the permanent magnet is not limited thereto. The symmetry is high in the cylindrical shape, so that the stability of rotation can be improved. However, if the bearing or the holder can be made in an appropriate shape to hold the permanent magnet 410 to rotate, the cylindrical shape is not required. For example, a prismatic shape is also acceptable. In the case of a cylindrical or a prismatic, not only a longitudinal shape with a height larger than the size of the bottom surface but also a disc shape with a diameter of the bottom surface larger than the height may also be acceptable. The cross-sectional area may also be variable along with the position in the height direction, for example, barrel shape with a larger cross-sectional area near the center or another shape having a larger cross-sectional area near the ends.

Here, FIG. 19 to FIG. 21 show the structure of an actuator 400' with a prismatic permanent magnet. FIG. 19 to FIG. 21 are perspective views or exploded perspective views corresponding to FIG. 14 to FIG. 16 showing the structure of the actuator 400'. In FIG. 19 to FIG. 21, the same portions as those of the actuator 400 are denoted by the same reference signs as those of FIG. 14 to FIG. 16.

In the actuator 400', the permanent magnet 410' is in a quadrangular prismatic shape, and its cross section on a plane perpendicular to the rotation axis is rectangular (refer to FIG. 22). Correspondingly, the thin-walled portion 402b' of the mirror holder 402' and the magnet holding portion 406a' of the magnet holder 406' to embed the permanent magnet 410' therein respectively have rectangular cross sections. Other components are the same as those of the actuator 400. The mirror holding portion 402a of the mirror holder 402' and the bearing connecting portion 406b of the magnet holder 406' are also in the same shape as those of the actuator 400.

As described above, the permanent magnet 410' with a rectangular cross section can have a neutral position similarly to the permanent magnet 410 of the actuator 400 due to the magnetic force between the N-pole 410n' and S-pole 401s' and the yoke 430 respectively. The permanent magnet 410' is subjected to a force in the rotation direction through the magnetic field generated by the current flowing through the driving coil 420, and when the current flowing through the driving coil 420 is turned off, the permanent magnet 410' returns to the neutral position, which is also the same as the case of the actuator 400. FIG. 22A to FIG. 22C shows the force applied to the permanent magnet 410' of the actuator 400' using an example corresponding to FIG. 18A to FIG. 18C.

Modified examples of the shape of the yoke 430 will be described. The yoke 430 is not limited to the shape shown in FIG. 13 and FIG. 14. For example, in the actuator 400, the shapes shown in FIG. 23A to FIG. 23C may also be employed. In FIG. 23A to FIG. 23C, the cross-sectional shape of the yoke on the plane perpendicular to the central axis of the permanent magnet 410 is schematically shown together with the cross-sectional shapes of the permanent magnet 410 and the first portion 421 and the second portion 422 of the driving coil 420.

The same shapes may be employed in the actuator 400', and a structural example in this case is shown in FIG. 24A to FIG. 24C. Since the function of the yoke in each shape is the same as that of the actuator 400, a representative will be described with reference to FIG. 23A to FIG. 23C.

The yoke 440 shown in FIG. 23A is in the same shape with one opening side similar to the yoke 430. However, unlike the yoke 430, the lower side in the figure corresponding to the second portion 432 is a curved portion 443. The yoke may also be in such a shape including a curved surface.

The cross section of the yoke 450 shown in FIG. 23B is in a rectangular shape, which covers the entire peripheral area of the permanent magnet 410 (but does not need to cover the longitudinal ends). Even if the entire peripheral area is covered, if portions (a first portion 451 and a second portion 452) at which the yoke 450 is near the central axis of the permanent magnet and portions (other portions) at which the yoke 450 is relatively far from the central axis are formed on the yoke 450, and the "near" portions are opposed to each other, the orientations at which two poles of the permanent magnet 410 respectively face the "near" portions become neutral positions, and the reciprocating rotation of the permanent magnet 410 similar to that described with reference to FIG. 13 to FIG. 18C can be performed.

The cross section of the yoke 460 shown in FIG. 23C is in an elliptical shape, which covers the entire peripheral area of the permanent magnet 410. Even if the entire yoke 460 is constituted by a continuous curved surface, if "near" portions (portions indicated by signs 461, 462) and "far" portions (other portions) are formed on the yoke 460 similarly to the case of FIG. 23B, and the "near" portions are opposed to each other, the reciprocating rotation of the permanent magnet 410 can also be performed as in the case of FIG. 23B. However, from the viewpoint of convenience of fixing the driving coil 420 to the yoke 430, the driving coil 420 is preferably fixed to the planar portions as in the yoke 450.

If only the first portion 431 and the second portion 432 of FIG. 17A are present to construct a minimum form, the neutral position of the permanent magnet 410 can also be generated, and the reciprocating rotation of the permanent magnet 410 similar to the case described with reference to FIG. 13 to FIG. 18C can also be performed. The first portion 431 and the second portion 432 may also be narrower in shape. However, in the circumstance of forming a closed magnetic circuitry and efficiently generating the magnetic force of the permanent magnet 410 for rotation, the peripheral area of the permanent magnet 410 is preferably covered by the yoke 450 as wide as possible. From this viewpoint, the yoke 450 and the yoke 460 cover the entire peripheral area of the permanent magnet 410.

If the entire peripheral area of the permanent magnet 410 is covered, the poles of the permanent magnet 410 are pulled in all directions, and thus the restoring force toward the neutral position may decrease. From this viewpoint, it is preferable that one direction is opened like the yoke 430 or the yoke 440 to enhance the restoring force toward the neutral position.

For example, in FIG. 23B, even if the distance from the central axis of the permanent magnet 410 to the first portion 451 of the yoke 450 is different from the distance to the second portion 452, if the neutral position of the permanent magnet 410 can be determined, the reciprocating rotation of the permanent magnet 410 similar to that described with reference to FIG. 13 to FIG. 18C can be performed.

In FIG. 23A, even if the distances from the central axis of the permanent magnet 410 to the curved portion 443 of the yoke 440 is shorter than the distances to the first portion 441 and the second portion 442, since there is no yoke on the opposite side of the curved portion 443, the two poles of the permanent magnet 410 are stable in the directions toward the first portion 441 and the second portion 442, and the positions of the poles may also be considered as neutral positions. At the neutral positions, even if the poles of the permanent magnet 410 do not face the side closest to the yoke 440, as long as a stable neutral position exists, the reciprocating rotation of the permanent magnet 410 similar to that described with reference to FIG. 13 to FIG. 18C can be performed.

However, if the distance from the central axis of the permanent magnet 410 to the yoke at the neutral position is equal at the N-pole 410n and the S-pole 410s, and the shape and configuration of the yoke 440 are determined such that the two poles face a direction at which the distance from the central axis of the permanent magnet 410 to the yoke is the nearest, the relationship between the orientation of the permanent magnet 410 and the strength of the restoring force is not distorted greatly during rotation of the permanent magnet 410, which is preferred from the viewpoint of stability of rotation of the permanent magnet 410.

When there is one neutral position, the position where the N-pole and the S-pole are exchanged, that is, the permanent magnet 410 rotates 180° from the one neutral position, is another neutral position. However, more than two neutral positions are undesirable. This is because, if the permanent magnet 410 rotates from one neutral position to a position close to another neutral position, the permanent magnet 410 cannot be restored to the original neutral position, and therefore, when there are two pairs of neutral positions or more, the range of reciprocating rotation cannot be expanded. For example, if the yoke has a square cross section and its center is located on the central axis of the permanent magnet 410, four neutral positions exist with every 90-degree interval. Even in such a structure, the reciprocating rotation of less than ±45 degrees can be performed in the same way as described with reference to FIG. 13 to FIG. 18C, but the movable range is narrowed as compared with the case of only two neutral positions.

Regarding the driving coil 420, the first portion 421 and the second portion 422 are preferably placed as close as possible to the poles of the permanent magnet 410 at the neutral position. Such placement is to make the magnetic field generated by the current flowing through these portions strongly interact with the permanent magnet 410. In this way, the first portion 421 and the second portion 422 are to be disposed at the position behind which the yoke is located if viewed from the permanent magnet 410. This arrangement has an advantage to strongly fix the driving coil 420 to the yoke.

5. Control of a Pulse Interval of a Beam Corresponding to a Scanning Position in the Primary Scanning Direction (FIG. 25 to FIG. 30)

Control of a pulse interval of a beam corresponding to a scanning position in the primary scanning direction of the projected light L2 will be described.

The control explained here is implemented in the case where the actuator 300 is adopted in the scanning assembly 30. In this case, the scanning position in the primary scanning direction corresponds to the orientation of the mirror unit 301 (particularly the first mirror 301a therein) in the actuator 300, so the control described here also corresponds to the orientation of the mirror unit 301.

Firstly, the characteristics of oscillation of the mirror unit 301 by the actuator 300 will be described with reference to FIG. 25 to FIG. 27. FIG. 25 is a graph illustrating the relation between the scan angle of the mirror unit 301 and the absolute value of the scanning angular velocity, FIG. 26 is a chart illustrating an example of a drive signal of the LD module 21, and FIG. 27 is a view illustrating an example of spots of projected light L2 formed on primary scanning lines.

According to the experiments by the inventor, the moving speed of the mirror unit 301 that is oscillated by the actuator 300 is not constant. The mirror unit 301 stops at the ends of the oscillation path and moves in the other parts, so the moving speed obviously varies. The moving speed is, as shown in FIG. 25, roughly lower as closer to the ends of the oscillation path and higher as closer to the midpoint. Counterclockwise rotation and clockwise rotation are different only in direction, and almost at the same speed at the same position.

In FIG. 25, the position along the oscillation path (described as rotation angle, and can be called a "scan angle") is plotted as the horizontal axis and the absolute value of the angular velocity corresponding to that position is plotted as the vertical axis.

Since the rotation speed of the mirror unit 301 varies, when the LD module 21 is driven by a drive signal drv1 having equally spaced pulses as shown in FIG. 26, spots 72 of projected light L2 as shown in FIG. 27 are formed on the primary scanning lines 71. That is, spots are distributed with large spatial interval in the center of the primary scanning direction, and spots are distributed with smaller spatial interval near the ends. Therefore, the detection resolution of the object is lower on the center scan path than that close to the ends of the scan path.

When the detection of an obstacle is considered as the use of the object detecting apparatus 10, the importance around the center of the field of view is considered to be high, so the above circumstance is not preferable.

Therefore, the object detecting apparatus 10 is provided with a control circuitry for controlling the pulse interval of the drive signal of the LD module 21 according to the scan angle of the mirror unit 301.

FIG. 28 shows the configuration of the control circuitry.

The control circuitry 351 shown in FIG. 28 corresponds to a cycle controller, and the control operation by the control circuitry 351 can be roughly divided into three operations: driving control of the driving coil 316, detection of rotation speed of the mirror unit 301, and control of the pulse interval of the LD module 21.

Firstly, regarding the driving control of the driving coil 316, the control circuitry 351 sets oscillation range and period of the scanning to be performed by the actuator 300 in a drive signal generation circuitry 352 that generates a drive signal 353 to be applied to the driving coil 316. The drive signal generation circuitry 352 generates, according to the set values, the drive signal 353 at an appropriate level of voltage varying with an appropriate period, and applies the drive signal 353 to the driving coil 316 of the actuator 300. Thereby, the actuator 300 can oscillate the mirror unit 301 as described with reference to FIG. 9.

Next, regarding the detection of rotation speed of the mirror unit 301, a detecting circuitry 354 detects induced voltage generated in the sensing coil 317 of the actuator 300, an ADC (Analog to Digital Converter) 355 converts the detected voltage into a digital value in real time, and a differential calculation unit 357 corrects the digital value and inputs the corrected value to the control circuitry 351. The control circuitry 351 calculates the rotation speed of the mirror unit 301 based on the input voltage value. The sensing coil 317 preferably has the same number of turns as the driving coil 316, and is preferably wound in reverse direction to the driving coil 316, but the sensing coil 317 is not limited to those.

When the mirror unit 301 is oscillated, an induced electromotive force caused by two factors is generated in the sensing coil 317.

The first factor is the induced electromotive force generated due to the changes in intensity and direction of the magnetic field generated by the driving coil 316 based on the change in voltage of the drive signal applied to the driving coil 316.

The second factor is the induced electromotive force caused by the change in intensity of the magnetic field due to the oscillation of the permanent magnet 321. When the permanent magnet 321 is oscillated as described with reference to FIG. 9 or the like, the varying rate of the intensity of the magnetic field generated in the sensing coil 317 due to the oscillation can be considered to be substantially proportional to the rotation angular velocity of the permanent magnet 321. Since the rotation angular velocity of the permanent magnet 321 is also the rotation angular velocity of the mirror unit 301, the intensity of the induced electromotive force generated due to the second factor is considered to be proportional to the rotation angular velocity of the mirror unit 301.

The mutually induced voltage pattern memory 356 and the differential calculation unit 357 are provided to subtract the value of the induced electromotive force caused by the first factor from the output of the ADC 355.

That is, the mutually induced voltage mode memory 356 stores the variation of the voltage value of the induced voltage generated in the sensing coil 317 due to mutual induction when the drive signal is applied to the driving coil 316 in the actuator 300 while the permanent magnet 321 is removed, to correspond to the phase of the drive signal, for a cycle of the drive signal. When applying a drive signal to the driving coil 316 in order to oscillate the mirror unit 301, the drive signal generation circuitry 352 provides a timing signal denoting the phase of the drive signal to the mutually induced voltage pattern memory 356. The mutually induced voltage pattern memory 356 provides the voltage value corresponding to the current timing to the differential calculation unit 357 based on the timing signal.

The differential calculation unit 357 subtracts the voltage value provided by the mutually induced voltage pattern memory 356 as a contribution amount of mutual inductance from the value of induced voltage actually generated in the sensing coil 317 and input by the ADC 355, and provides the difference to the control circuitry 351.

Thereby, the value of induced voltage proportional to the rotation angular velocity of the mirror unit 301 can be input to the control circuitry 351. If the induced voltage input to the control circuitry 351 is plotted in graph 361 where the horizontal axis indicates the half period from one end to another end of the oscillation range of the mirror unit 301, it is the similar distribution to that of the angular velocity illustrated in FIG. 25.

The control circuitry 351 multiplies the voltage value VR(t) provided by the differential calculation unit 357 at the time t by a preset constant K to obtain the angular velocity $\omega(t)$ of the mirror unit 301 by $\omega(t)=K \times VR(t)$.

The preset value of K is determined, for example, through the rotation angle of the mirror 31a for the entire half period measured by other experimental means and an integral value of the voltage value VR(t) corresponding to the same half period.

The control circuitry 351 can calculate, by using $\omega(t)$, a firing interval T for lighting the LD module 21 at an interval to obtain a desired resolution on the primary scanning lines 71a. $T=\pi \cdot (\psi/180)/\omega(t)$, where the resolution is $\psi$ degrees.

In order to control the pulse interval of the LD module 21, the control circuitry 351 calculates the firing interval T in real time in response to input of the voltage value VR(t) from the differential calculation unit 357, and provides a pulse repetition modulation signal indicating the T value to the pulse generator 358.

The pulse generator 358 performs pulse repetition modulation according to the pulse repetition modulation signal to generate a timing signal having a pulse of the interval T, and provides the timing signal to the laser drive circuitry 22. The laser drive circuitry 22 generates a drive signal for lighting the LD module 21 at the time of the pulse included in the timing signal provided by the pulse generator 358, and provides the drive signal to the LD module 21.

The pulse interval provided by the control circuitry 351 to the pulse generator 358 for the period from one end to the other end of the oscillation range of the mirror unit 301 is shown in graph 362, taking time as the horizontal axis as in the graph 361. That is, the control circuitry 351 controls, according to the induced voltage generated in the sensing coil 317, the pulse interval of the LD module 21 to be shortened in a case where the mirror unit 301 is near the center of the oscillation path and the induced voltage is at a high level (first level), compared with the case where the mirror unit 301 is near the end of the oscillation path and the induced voltage is at a low level (second level).

As a result, as indicated by the symbol drv2 illustrated in FIG. 29, the drive signal of the LD module 21 output by the laser drive circuitry 22 is characteristic with non-equal pulse intervals corresponding to the moving speed of the mirror unit 301. Then, as shown in FIG. 30, beam spots 72 obtained by deflecting the pulse-controlled laser beam L1 by the mirror unit 301 are arranged at substantially equal intervals over the entire length of the primary scanning lines 71a. Thus, the object detecting apparatus 10 can detect the object with substantially equal resolution within the field of view 70 thereof.

In the secondary scanning direction, since the mirror 381 is stationary during the scanning along one primary scanning line, the above problem does not occur, and it is not necessary to adjust the pulse interval.

The control circuitry 351 may be provided as a part of the processor circuitry 53, or provided separately from the processor circuitry 53. The control by the control circuitry 351 may be implemented by dedicated hardware, or by causing a general-purpose processor to execute software, or by a combination thereof.

Although an example of control based on the voltage value of the induced voltage generated in the sensing coil 317 has been described with reference to FIG. 28, the same control can be performed even using the current value of the induced current.

6. Another Example of Control of a Pulse Interval of a Beam Corresponding to a Scanning Position in the Primary Scanning Direction (FIG. 31 and FIG. 32)

Another example of control of a pulse interval of a beam corresponding to a scanning position in the primary scanning direction of the projected light L2 will be described.

The control explained here is implemented in the case where the actuator 400 is adopted in the scanning assembly 30. The same control can also be applied to the case of adopting the actuator 400'. The basic idea of the control is the same as that of the control described with reference to FIG. 25 to FIG. 30, except the method of detecting the scanning position or orientation of the mirror 401. Therefore, the description will focus on this point.

FIG. 31 is a perspective view of an actuator 400" as a modified example of the actuator 400 in the case where the pulse interval of the beam is controlled, corresponding to FIG. 14.

In the actuator 400", a notch for fixing a magnet for detection 481 is provided near the center of the front end (the opposite side of the permanent magnet 410) of the mirror 401". The magnet for detection 481 is disposed such that the rotation axis 404 of the mirror 401" passes through the center thereof.

The actuator 400" comprises a magnetic sensor 482 opposite to the magnet for detection 481. The magnetic sensor 482 includes a magnetoresistive element whose resistance value varies according to the direction of the surrounding magnetic field. The magnetic sensor 482 is a magnetoresistive sensor (MR sensor) that outputs a signal of current or voltage corresponding to the direction of the surrounding magnetic field. By arranging the magnetic sensor 482 near the magnet for detection 481, a signal of current or voltage corresponding to the direction of the magnetic field generated by the magnet for detection 481, that is, the direction of the magnet for detection 481 can be output.

The magnetoresistive element (MR element) may be various elements such as an anisotropic magnetoresistive element (AMR element), a gigantic magnetoresistive element (GMR element), and a tunnel magnetoresistive element (TMR element). These MR elements are capable of detecting the direction of the magnetic field with high precision without depending on the strength of the magnetic field, and are suitable for detecting the rotation speed of the mirror 401". The magnetic sensor 482 may be fixed to the actuator 400" using a holder or the like, or fixed to the structure of the scanning assembly 30 while positioning with the actuator 400", or fixed to the structure of the object detecting apparatus 10.

FIG. 32 illustrates a structure of a control circuitry that controls the pulse interval of a beam. The same portions as those of FIG. 28 are denoted by the same signs.

The control circuitry 471 shown in FIG. 32 corresponds to a cycle controller, and the control operation by the control circuitry 351 can be roughly divided into three operations: driving control of the driving coil 420, detection of rotation speed of the mirror unit 401", and control of the pulse interval of the LD module 21.

Firstly, regarding the driving control of the driving coil 420, the control circuitry 471 sets oscillation range and period of the scanning to be performed by the actuator 400" in a drive signal generation circuitry 472 that generates a drive signal 473 to be applied to the driving coil 420. The drive signal generation circuitry 472 generates, according to the set values, the drive signal 473 at an appropriate level of voltage varying with an appropriate period, and applies the drive signal 473 to the driving coil 420 of the actuator 400". Thereby, as described with reference to FIG. 17 and FIG. 18, the permanent magnet 410 can be rotated, and the actuator 400" can oscillate the mirror 401". Meanwhile, the magnet for detection 481 also oscillates together with the mirror 401".

Regarding to the detection of the rotation speed of the mirror 401", the magnetic sensor 482 detects the orientation of the magnet for detection 481 in real time, and outputs a signal of current or voltage corresponding to the orientation. An ADC (Analog to Digital Converter) 483 converts the signal output by the magnetic sensor 482 into a digital value in real time, and provides the digital value to a scanning speed calculation circuitry 484. The scanning speed calculation circuitry 484 converts the signal input by the ADC 483 into an orientation angle of the magnet for detection 481 based on the pre-restored corresponding relationship between the signal level of the magnetic sensor 482 and the orientation angle of the magnet for detection 481, then calculates, based on the temporal rate of change of the orientation angle, the rotation angular velocity of the magnet for detection 481, that is, the rotation angular velocity (scanning speed) of the mirror 401", and provides the rotation angular velocity to the control circuitry 471.

If the rotation angular velocity input to the control circuitry 471 is plotted in graph 491 where the horizontal axis indicates the half period from one end to another end of the oscillation range of the mirror 401", it is the similar distribution to that of the angular velocity illustrated in FIG. 25.

The control circuitry 471 calculates, by using the angular velocity ω(t) of the mirror 401" input by the ADC 483 at each timing t, the firing interval T for lighting the LD module 21 to obtain a desired resolution on the primary scanning lines 71a. T=π•(ψ/180)/ω(t), where the resolution is ψ degrees. For example, ψ=0.1.

In order to control the pulse interval of the LD module 21, the control circuitry 471 calculates the firing interval T in real time in response to input of the angular velocity ω(t) from the ADC 483, and provides a pulse repetition modulation signal indicating the T value to the pulse generator 358.

The function of the pulse generator 358 is the same as that in FIG. 28. The pulse interval provided by control circuitry 471 to the pulse generator 358 is also the same as that in FIG. 28, as shown in the graph 362. This is because, similar to the actuator 300, the actuator 400" also oscillates the mirror to perform reciprocating rotation by using the system having a restoring force to the neutral position, and thus the relationship between the scanning position and the scanning speed is similar to that of the actuator 300.

Therefore, the structure of FIG. 31 and FIG. 32 can realize beam spots 72 arranged at substantially equal spatial intervals over the entire length of the primary scanning lines 71a, as in the case of FIG. 28.

The magnetic sensor 482 may also be a sensing coil or a Hall element. The magnet for detection 481 is not necessarily disposed near the center of the end of the mirror 401", but may be provided at any position as long as the magnetic sensor 482 can detect the change in the magnetic force when the mirror 401" rotates. In order to improve the detection accuracy, the magnet for detection 481 is preferably not on the side of the magnet 410.

Instead of adopting the magnetic sensor 482, the angle of the mirror 401" is detected by optically detecting the position of the mirror 401" itself or a mark formed on the mirror 401". In this case, the magnet for detection 481 is not required.

7. Other Examples of the Ferromagnetic Materials

The embodiments described above are forms where a soft magnetic material which is a ferromagnetic material is placed surrounding the driving coil 420 along the central axis of the permanent magnet 410. However, the ferromagnetic material may also be a hard magnetic material such as a magnet. Several examples of the actuator 400 adopting a magnet or magnets as the ferromagnetic material will be described referring to FIG. 33A to FIG. 35. The corresponding portions same as those of described embodiments above are denoted by the same signs.

FIG. 33A to FIG. 33C are views corresponding to FIG. 17A to FIG. 17C respectively, for explaining the reciprocating rotation of the actuator 400 in an example adopting a magnet or magnets as the ferromagnetic material. FIG. 34 and FIG. 35 are views, corresponding to FIG. 23A to FIG. 24C respectively, showing configuration examples of a magnet or magnets corresponding to the example in FIG. 33A to FIG. 33C.

As shown in FIG. 33A, an N-pole 600n and an S-pole 600s of a magnet is placed exterior to the driving coil 420 and face each other across the central axis of the movable permanent magnet 410. If no voltage is applied to the driving coil 420, the permanent magnet 410 stops in such an orientation that the S-pole 410s thereof faces the N-pole 600n, and the N-pole 410n thereof faces the S-pole 600s because of the mutual magnetic attraction force between the magnetic poles. Thus, this position is a neutral position.

Then, when a voltage is applied to the driving coil 420, the permanent magnet 410 will rotate as shown in FIG. 33B, similar as the case indicated in FIG. 17 and FIG. 18. When the voltage is turned off thereafter, the permanent magnet 410 will return to the neutral position.

Accordingly, by applying a drive signal with a periodically alternated voltage or current to the driving coil 420, the actuator 400 will make the permanent magnet 410 and the mirror 401 perform reciprocating rotation (oscillation) similar as the case in FIG. 17 and FIG. 18.

Further, in the configuration of FIG. 33, strength of the restoring force to move the permanent magnet 410 to the neutral position can be easily modified through the magnetic force generated at the N-pole 600n and/or the S-pole 600s. Accordingly, the resonant frequency of the actuator 400 can also be easily modified. By using the N-pole 600n and the S-pole 600s of the magnet, much stronger restoring force may also be generated than the case of a soft magnetic material such as the yoke 430, and thus a higher resonant frequency can be expected.

The embodiment of the N-pole 600n and the S-pole 600s in FIG. 33 can be configured, for example, as shown in FIG. 34. That is, one piece of U-shaped magnet 610 where an N-pole 610n and an S-pole 610s thereof face each other across the central axis of the permanent magnet 410.

Alternatively, the N-pole 600n and the S-pole 600s can also be configured, as shown in FIG. 35, as the embodiment using a first magnet 621 and a second magnet 622. The first magnet 621 and the second magnet 622 are separated across the central axis of the permanent magnet 410 and an N-pole 621n of the first magnet and an S-pole of the second magnet 622 face each other across the central axis of the permanent magnet 410.

The U-shaped magnet 610, the first magnet 621 and the second magnet 622 are rigidly coupled to the bearing 403 and the bearing 405, similar as the case when using the yoke 430. The driving coil is fixed to the U-shaped magnet 610, or to the first magnet 621 and the second magnet 622.

Note that such magnet or magnets including the N-pole 600n and/or the S-pole 600s may also be an electromagnet or a plurality of electromagnets. A coil or a core constituting the electromagnet is generally a ferromagnetic material as well.

8. Other Modified Examples

The embodiments in the present invention have been described. However, in the present invention, the specific structure of the apparatus, specific operation sequence, specific shape of components, and the like are not limited to those described in the above embodiments.

The features described in the above embodiments may be independently applied to an apparatus or a system, respectively. Particularly, the actuator 300, the actuator 400, the movable member 320, and the like may be separately distributed as components. Their use is not limited to the object detecting apparatus.

The above object detecting apparatus 10 may be configured in a compact size portable on a human palm, is suitable for being mounted on a mobility object such as a vehicle or a drone device, and is used as an obstacle detecting apparatus for autonomous driving, but its purpose is not limited thereto. The object detecting apparatus may also be fixed on a post or a wall, etc., for fixed point observation.

A program of the present invention is implemented to cause one computer or a plurality of computers to cooperate to control necessary hardware, so as to realize the function of adjusting the pulse interval of the LD module 21 included in the object detecting apparatus 10 of the above embodiments, or to perform the processing described in the above embodiments.

Such a program may also be stored in a ROM or other non-volatile storage media (flash memory, EEPROM, etc.) of a computer. The program may also be provided as any non-volatile storage medium such as a memory card, a CD, a DVD, or a Blue-Ray™ disc storing the program. The program may also be downloaded from an external apparatus connected to a network and installed on a computer to run.

Of course, the structures of the embodiments and modified examples described above can be arbitrarily combined as long as they do not contradict each other, and only a part of them can be taken out for implementing.

REFERENCE LIST

10 . . . object detecting apparatus
20 . . . light projecting unit
21 . . . LD module
22 . . . laser drive circuitry
23 . . . collimating lens assembly
30 . . . scanning assembly
31 . . . mirror
32 . . . actuator
40 . . . light reception unit
41, 48 . . . mirror
42 . . . collective lens
43 . . . light-receiving element
44 . . . aperture
51 . . . front-end circuitry
52 . . . TDC circuitry
53 . . . processor circuitry
54 . . . input/output unit
61 . . . top cover
62 . . . rear cover
63 . . . cover clip
64 . . . protective material
70 . . . field of view
71 . . . scanning line
72 . . . spot
300, 380, 400, 400', 400" . . . actuator
301 . . . mirror unit
301a . . . first mirror
301b . . . second mirror
301a1 . . . first reflecting surface 301b1 . . . second reflecting surface
302 . . . torsion spring
304, 384, 404 . . . rotation axis
311 . . . core yoke
312 . . . frame yoke
313 . . . coil assembly
314 . . . top yoke
315 . . . screw
316 . . . driving coil
317 . . . sensing coil
320 . . . movable member
321 . . . permanent magnet
321s . . . S-pole
321n . . . N-pole
381, 401, 401" . . . mirror
382 . . . shaft
383 . . . holder
402, 402' . . . mirror holder
403, 405 . . . bearing
406, 406' . . . magnet holder
410, 410' . . . permanent magnet
410s . . . S-pole
410n . . . N-pole
420 . . . driving coil
421, 422 . . . first and second portions of the driving coil
423, 424 . . . first and second connecting portions of the driving coil
430, 440, 450, 460 . . . yoke
431-433 . . . first to third portions of the yoke 430
441-442 . . . first and second portions of the yoke 440
451-452 . . . first and second portions of the yoke 450
481 . . . magnet for detection
482 . . . magnetic sensor
610 . . . U-shaped magnet
621 . . . first magnet
622 . . . second magnet
L1 . . . laser beam
L2 . . . projected light
L3, L4 . . . returned light

The invention claimed is:

1. An actuator, comprising:
a movable magnet having a column shape and an S-pole and an N-pole, the S-pole and the N-pole being disposed on opposite sides of a central axis of the movable magnet from each other;
a support member configured to support the movable magnets such that the movable magnet is rotatable around the central axis;
a driving coil including a first portion and a second portion disposed on opposite sides of the movable magnet from each other, the first portion including a first wire bundle, the second portion including a second wire bundle, and current being configured to flow in opposite directions in the first portion and the second portion when powered on;
a ferromagnetic material disposed outside the driving coil along the central axis such that a distance from the central axis to the ferromagnetic material on a plane perpendicular to the central axis varies with a direction from the central axis; and
a driving circuitry configured to apply a drive signal, the drive signal having a periodically varying voltage or current,
wherein the movable magnet is configured to perform reciprocating rotation such that the movable magnet reciprocally rotates within a certain angular range in accordance with the drive signal applied by the driving circuitry.

2. The actuator according to claim 1, wherein
the ferromagnetic material is a soft magnetic material for generating a restoring force to rotate the movable magnet toward the neutral position due to an interaction between a magnetic field of the movable magnet and the ferromagnetic material, and
the ferromagnetic material has an extended area facing the poles of the movable magnet at the neutral position and has an elongated cross-section away from the central axis in the plane perpendicular to the central axis.

3. The actuator according to claim 2, wherein
the movable magnet is configured to be disposed at a neutral position when no voltage is applied to the driving coil,
distances from the central axis to the soft magnetic material are equal on both sides of the N-pole and the S-pole of the movable magnet at the neutral position, and the N-pole and the S-pole of the movable magnet at the neutral position face a direction with a shortest distance from the central axis to the soft magnetic material.

4. The actuator according to claim 1, wherein
the ferromagnetic material is a single magnet, and an N-pole and an S-pole of the single magnet face each other across the central axis of the movable magnet.

5. The actuator according to claim 1, wherein
the ferromagnetic material includes a first magnet and a second magnet spaced apart from each other, and an N-pole of the first magnet and an S-pole of the second magnet face each other across the central axis of the movable magnet.

6. The actuator according to claim 1, wherein
the movable magnet is cylindrical.

7. The actuator according to claim 1, wherein
the movable magnet is prismatic.

8. The actuator according to claim 1, wherein
the movable magnet is configured to be disposed at a neutral position when no voltage is applied to the driving coil, and
the first portion and the second portion of the driving coil are respectively located opposite to the S pole and the N-pole of the movable magnet at the neutral position.

9. The actuator according to claim 1, wherein
the driving coil is arranged such that wire of the driving coil is connected to a first end of the second portion by winding from a first end of the first portion around the central axis of the movable magnet along a surface of the movable magnet, and connected to a second end of the first portion by winding from a second end of the second portion around the central axis of the movable magnet along the surface of the movable magnet.

10. The actuator according to claim 1, wherein
the movable magnet is configured to perform reciprocating rotation in accordance with the drive signal applied by the driving circuitry within a range centered on the neutral position.

11. The actuator according to claim 1, further comprising
a mirror fixed to an end portion of the movable magnet in a longitudinal direction of the movable magnet,
the mirror being configured to perform reciprocating rotation in accordance with the drive signal applied by the driving circuitry.

12. The actuator according to claim 11, further comprising another magnet disposed at an end of the mirror such that the another magnet and the movable magnet are disposed on opposite ends of the mirror from each other.

13. A light scanning apparatus, comprising
the actuator according to claim 11,
the light scanning apparatus being configured to reflect a beam at the mirror and project the reflected beam.

14. An object detecting apparatus, comprising:
the actuator according to claim 11,
a laser light source configured to output a laser beam;
a light receiving element;
an optical assembly configured to reflect the laser beam at the mirror and project the reflected laser beam to the outside, and to guide incident light incident from the outside, to the light-receiving element; and
an object detecting assembly configured to detect a distance to an object located along an optical path of the projected laser beam and a direction in which the object is located, based on a projection timing and a projection direction of the laser beam and a timing of a light detection signal output by the light-receiving element.

15. The object detecting apparatus according to claim 14, further comprising:
a speed detecting circuitry configured to detect a rotation speed of the mirror; and
a pulse controller configured to control a pulse interval of the laser light source based on the rotation speed detected by the speed detecting circuitry.

16. The object detecting apparatus according to claim 15, further comprising
another magnet disposed at an end of the mirror such that the another magnet and the movable magnet are disposed on opposite ends of the mirror from each other,
wherein the speed detecting circuitry includes a magnetic sensor facing the another magnet and is configured to detect the rotation speed of the mirror based on a change in magnetism detected by the magnetic sensor.

17. The object detecting apparatus according to claim 16, wherein
the magnetic sensor is a magnetoresistive sensor that detects direction of a magnetic field with a magnetoresistive element.

18. The actuator according to claim 1,
wherein wires of the first portion extend across a position facing one of the S-pole and the N-pole of the movable magnet at the neutral position, and wires of the second portion extend across a position facing the other of the S-pole and the N-pole of the movable magnet at the neutral position.

19. The actuator according to claim 1,
wherein the first wire bundle is arranged generally parallel to the central axis, and the second wire bundle is arranged generally parallel to the central axis.

* * * * *